United States Patent
Fang

(10) Patent No.: US 12,126,580 B2
(45) Date of Patent: Oct. 22, 2024

(54) TRANSIENT CHATROOMS ADAPTED TO PROVIDE COMMUNICATIONS AMONG DRIVERS

(71) Applicant: Shusheng Fang, Upper Saddle River, NJ (US)

(72) Inventor: Shusheng Fang, Upper Saddle River, NJ (US)

(*) Notice: Subject to any disclaimer, the term of this patent is extended or adjusted under 35 U.S.C. 154(b) by 452 days.

(21) Appl. No.: 17/645,967

(22) Filed: Dec. 24, 2021

(65) Prior Publication Data

US 2023/0048886 A1 Feb. 16, 2023

Related U.S. Application Data

(63) Continuation-in-part of application No. 17/398,880, filed on Aug. 10, 2021.

(51) Int. Cl.
*H04L 51/046* (2022.01)
*B60W 40/10* (2012.01)
(Continued)

(52) U.S. Cl.
CPC ........... *H04L 51/046* (2013.01); *B60W 40/10* (2013.01); *H04L 51/58* (2022.05); *H04W 4/46* (2018.02); *H04W 4/80* (2018.02); *B60W 2556/65* (2020.02)

(58) Field of Classification Search
CPC ..... H04L 51/222; H04L 51/043; H04L 67/52; H04L 67/54; H04L 12/1818;
(Continued)

(56) References Cited

U.S. PATENT DOCUMENTS

| | | | |
|---|---|---|---|
| 8,417,768 B2* | 4/2013 | Suetsugu | G06F 13/385 709/204 |
| 9,363,674 B2* | 6/2016 | Altuwaiyan | H04L 63/0861 |

(Continued)

FOREIGN PATENT DOCUMENTS

| | | |
|---|---|---|
| CN | 103428006 A | 12/2013 |
| CN | 110062325 A | 7/2019 |
| CN | 112165688 A | 1/2021 |

OTHER PUBLICATIONS

Lu Han et al: "Ad-hoc voice-based group communication" Pervasive Computing and Communications (PERCOM), 2010 IEEE International Conference on, IEEE, Piscataway, NJ, USA, Mar. 29, 2010 (Mar. 29, 2010), pp. 190-198, XP031677609, ISBN: 978-1-4244-5329-0.

(Continued)

*Primary Examiner* — Matthew C Sams
(74) *Attorney, Agent, or Firm* — Tatonetti IP

(57) ABSTRACT

A transient virtual chatroom is implemented by which unknown drivers can temporarily engage in conversation while driving. The chatrooms are dynamically generated among two or more drivers based on a variety of factors, including the distance between the drivers, the direction in which cars are driving, the roads on which the cars are on, the speed of vehicles, and typical scenarios that indicate a desire for two or more drivers to engage in conversation. Such transient chatrooms can increase safety by enabling drivers to understand other drivers' intentions. For example, drivers can directly tell someone who can go first at a stop sign, which direction the driver is trying to go in, whether there is an emergency (e.g., personal or with their vehicle), whether a driver is changing lanes, notify a user of merging from an on-ramp, etc.

19 Claims, 20 Drawing Sheets

(51) Int. Cl.
*H04L 51/58* (2022.01)
*H04W 4/46* (2018.01)
*H04W 4/80* (2018.01)

(58) Field of Classification Search
CPC . H04L 12/1822; H04L 12/185; H04L 51/046; H04L 51/52; H04L 63/0861; H04L 63/104; H04L 63/107; H04L 65/1066; H04L 65/1089; H04L 65/1093; H04L 65/403; H04L 67/12; H04L 67/125; H04L 67/306; H04L 67/535; G06F 13/385; G06F 16/25; G06F 16/285; G06F 16/40; G06F 16/60; G06F 16/686; G06F 16/951; G06F 3/165; G06F 3/167; H04M 2250/12; H04M 2250/62; H04M 1/6075; H04W 4/02; H04W 4/029; H04W 4/08; H04W 4/46; H04W 12/06; H04W 12/08; H04W 12/30; H04W 12/64; H04W 4/021; H04W 4/023; H04W 4/21; H04W 8/005; H04W 8/186; G06Q 50/01; G10L 15/26; H04B 1/3822

See application file for complete search history.

(56) References Cited

U.S. PATENT DOCUMENTS

| | | | |
|---|---|---|---|
| 9,900,354 B1* | 2/2018 | Thome | H04L 65/403 |
| 2011/0072083 A1* | 3/2011 | Suetsugu | H04L 67/54 |
| | | | 709/203 |
| 2011/0300840 A1* | 12/2011 | Basir | G10L 15/26 |
| | | | 709/217 |
| 2013/0086164 A1* | 4/2013 | Wheeler | H04W 4/023 |
| | | | 709/204 |

OTHER PUBLICATIONS

European Search Report published Feb. 20, 2023 issued in connection with International Application No. EP22170514 (2 pages total).
European Search Opinion published Feb. 20, 2023 issued in connection with International Application No. EP22170514 (5 pages total).

* cited by examiner

FIG 15
1500
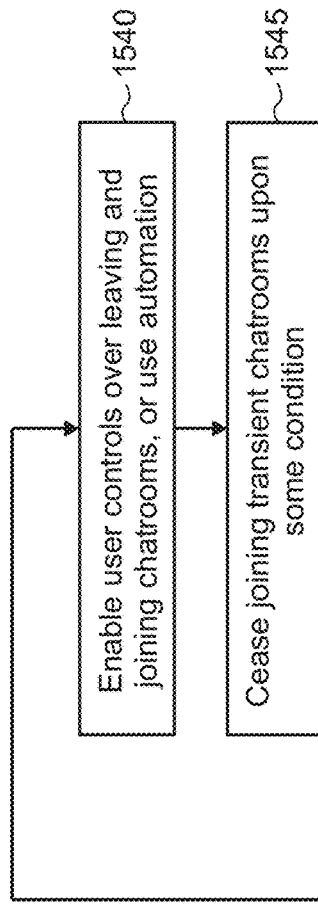
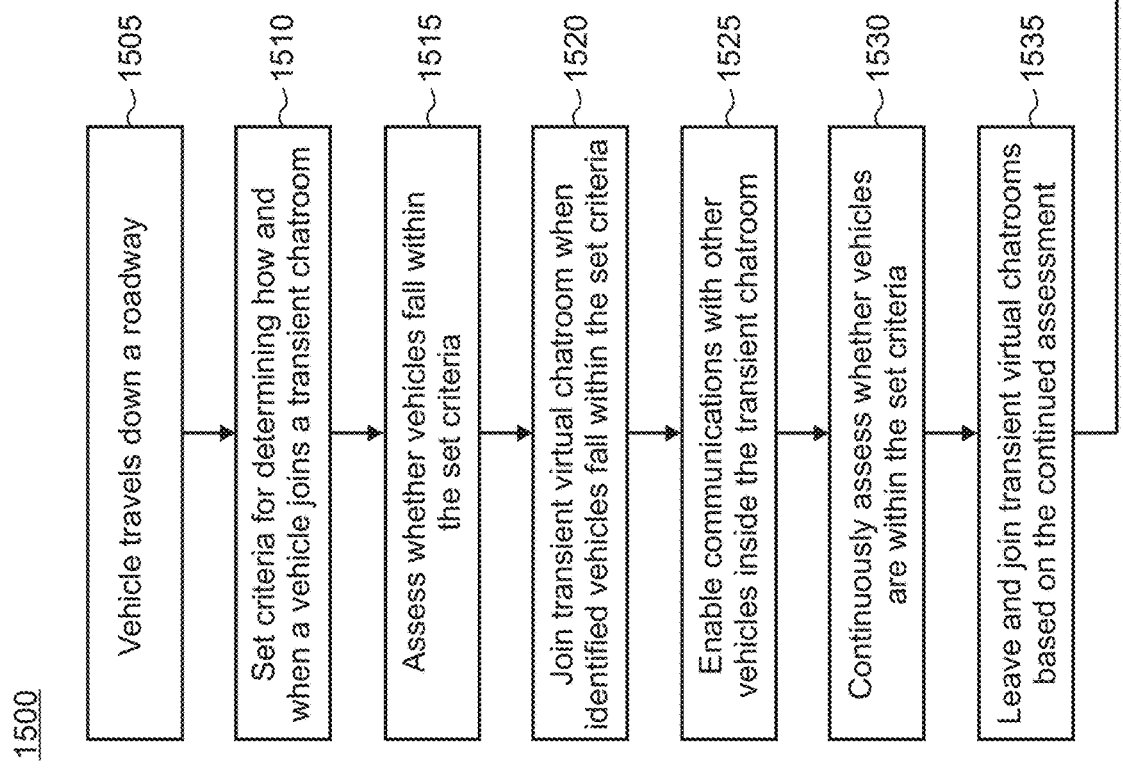

1600

1700

TRANSIENT CHATROOMS ADAPTED TO PROVIDE COMMUNICATIONS AMONG DRIVERS

CROSS-REFERENCES TO RELATED APPLICATIONS

This Non-Provisional Utility patent application is a Continuation-In-Part (CIP) application of U.S. Non-Provisional application Ser. No. 17/398,880, filed Aug. 10, 2021, entitled "Method and System for Provisioning Realtime Social Community Based on Location Service," the entire contents of which is hereby incorporated herein by reference.

BACKGROUND

Vehicles of all types are the most common mode of transportation for people. While drivers can communicate with each other using their vehicle's light signals, horns, and perhaps hand gestures, such modes are antiquated and, at times, insufficient. There are numerous driving scenarios in which drivers can benefit from a more direct mode of communication, such as when cars are switching lanes, merging onto a highway, or when cars are stuck in traffic.

SUMMARY

A transient virtual chatroom is implemented by which unknown drivers can temporarily engage in conversation while driving. The chatrooms are dynamically generated among two or more drivers based on a variety of factors, including the distance between the drivers, the direction in which cars are driving, the roads on which the cars are on, the speed of vehicles, and typical scenarios that indicate a desire for two or more drivers to engage in conversation.

Such transient chatrooms can increase safety by enabling drivers to understand other drivers' intentions. For example, drivers can directly tell someone who can go first at a stop sign, which direction the driver is trying to go in, whether there is an emergency (e.g., personal or with their vehicle), whether a driver is changing lanes, notify a user of merging from an on-ramp, etc. Such driver-centric discussions can remove the guessing between two drivers' actions on the road, thereby reducing accidents.

The transient virtual chatroom can be utilized for various other scenarios as well, including enabling "small talk" conversation between drivers stuck in traffic or driving in the same direction (whether for a long or short trip), making friends with other drivers, notifying other drivers about events such as accidents or road work ahead, notifying other drivers which lane an event is in, and notifying other drivers to reduce speed. Additional scenarios include enabling police officers or other emergency responders to directly communicate with drivers (e.g., to pull them over), notifying a car owner to move their car, connecting drivers that have similar interests such as a vehicle club for common vehicle brand owners (among other groups), and asking other drivers for directions to a given location.

The transient virtual chatroom may operate with a local chatroom application instantiated on each user's computing device, such as their smartphone, tablet computer, vehicle, or a combination thereof. A remote service may be configured with the chatroom application and communicate with the local chatroom applications.

For example, the remote service dynamically creates virtual chatrooms based on available information about each vehicle. The locally instantiated applications are then dynamically welcomed into chatrooms to enable communication among other drivers invited into and present in the chatroom. Once users are inside chatrooms, they may communicate directly with each other's local applications, like a walkie-talkie, telephone conversation, or virtual chat. Alternatively, all communications may continue to be routed through the remote service or a combination of the two modes of communication. Alternatively, the local chatroom applications may be configured to create, invite, and manage chatrooms amongst each other. For example, one driver's chatroom application may connect with another using some short-range communication protocols (e.g., Bluetooth®, NFC (Near Field Communication), Wi-Fi, etc.). Such dynamic connections may be used as the channel through which communications are exchanged.

In typical implementations, users are automatically entered into chatrooms to remove any burden on drivers while operating their vehicles. In some implementations, however, the driver may be invited into a chatroom via some prompt, and in response, the driver can accept or reject the invitation. Furthermore, drivers may set pre-set criteria for entering chatrooms based on scenarios. For example, in driving-centric scenarios, such as merging lanes, stopping at a stop sign or red light, etc., the chatroom application may be configured to automatically enter and accept all chatroom invitations so that the driver can easily and seamlessly communicate without hassle. Alternatively, in more friendly-centric scenarios such as being stuck in traffic, the chatroom application may be configured to enter the user into an invited chatroom responsive to acceptance. Other customizations may also be available, such as the user requiring manual acceptance into all chatrooms or authorizing automatic acceptance into all chatrooms.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from reading the following Detailed Description and reviewing the associated drawings.

BRIEF DESCRIPTION OF THE DRAWINGS

FIGS. 15-18 show illustrative processes implemented by one or more of the remote service or a vehicle's computer system;

Like reference numerals indicate like elements in the drawings. Elements are not drawn to scale unless otherwise indicated.

DETAILED DESCRIPTION

Figure 1:
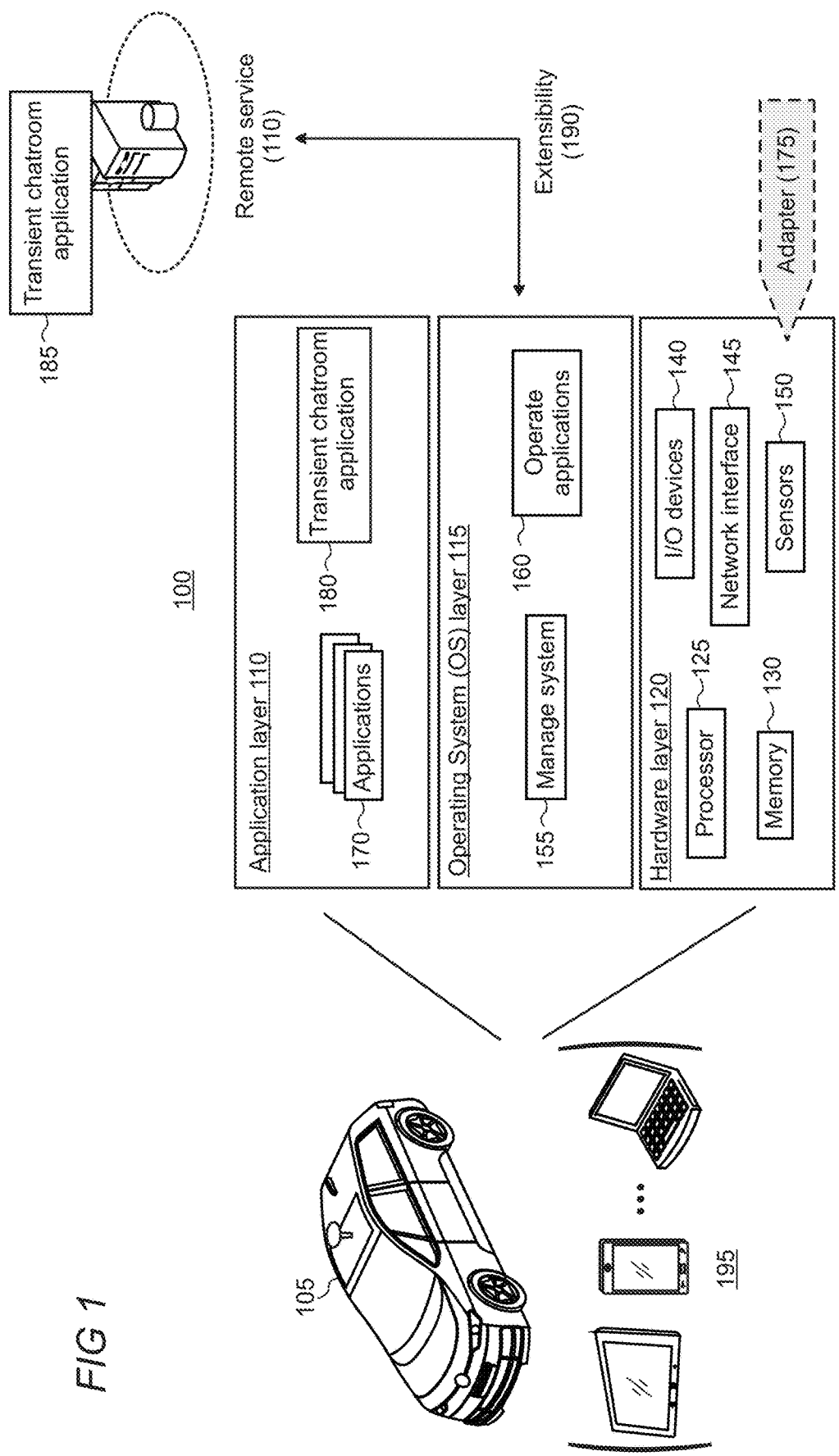
FIG. 1 shows an illustrative layered architecture of a car's computer system or user associated computing device.

FIG. 1 shows a simplified layered architecture 100 of a vehicle 105 or a computing device 195, such as a mobile device, smartphone, tablet, laptop, etc., that may implement the features described herein. While examples herein may refer to a vehicle's onboard computer system performing the various operations, a distinct user computing device, like a smartphone, may alternatively be utilized to operate the functions here and implement, for example, the transient chatroom application 180. The layered architecture is tailored to the vehicle's computer system; thus, any discussion of the "vehicle" is with reference to the vehicle's onboard or associated computing device.

The vehicle 105 or computing device 195 can include a hardware layer 120, operating system (OS) layer 115, and application layer 110. The hardware layer 120 provides an abstraction of the various hardware used by the vehicle 105 (e.g., input and output devices, networking and radio hardware, etc.) to the layers above it. In this illustrative example, the hardware layer supports processor(s) 125, memory 130, input/output devices (e.g., keyboard, display screen, touchscreen display, microphone, speaker, etc.) 140, and sensors 150 for detecting data about the car, which can be used when the transient chatrooms are generated or for driverless car features, as discussed in greater detail below. A description of the driverless car components is discussed in greater detail with respect to FIG. 2. The vehicle can include a network interface 145, such as a network interface card (NIC), enabling a wireless connection to the Internet. The network interface may work with a cellular connection to a cell tower or utilize Wi-Fi to connect to the Internet. The network interface can enable the vehicle to communicate with the remote service 110 (e.g., transmit data and feedback, receive settings and notifications, etc.).

In some implementations, the vehicle can support short-range communications over Bluetooth® or NFC (Near Field Communication), such as to a user's computing device or other vehicles.

The application layer 110 in this illustrative example supports various applications 170, including a transient chatroom application 180. The transient chatroom application may be utilized to connect the vehicle to chatrooms or otherwise enable the vehicle to communicate with other vehicles, as discussed in greater detail below. Although the various applications are depicted as standalone applications in FIG. 1, the applications may alternatively operate within the same application, as a plugin to other applications or the OS, or interoperate with remotely executing code, such as with the remote service 110.

Although only certain applications are depicted in FIG. 1, the vehicle 105 can utilize any number of applications 170. The applications are often implemented using locally executing code. In some cases, however, these applications can rely on services and/or remote code execution provided by remote servers or other computing platforms such as those supported by a service provider or other cloud-based resources (not shown). The vehicle may be configured with extensibility 190 to the remote service or other computing devices, such as by using its network interface 145. Furthermore, the remote service may be configured with a transient chatroom application 185 that is utilized to generate and manage transient virtual chatrooms.

The OS layer 115 supports, among other operations, managing system 155 and operating applications/programs 160. The OS layer may interoperate with the application and hardware layers in order to perform various functions and features.

The vehicle may utilize an adapter 175 that functions as a computing device and hosts the transient chatroom application 180. The adapter may be a computing device that plugs into a port (e.g., universal serial bus (USB)) on the vehicle, may be a software plugin to the vehicle, or may alternatively be a separate and distinct computing device, such as a mobile device 195, utilized within the vehicle. The mobile device may connect to the vehicle's I/O devices 140, such as through Bluetooth® to enable voice communications and output any sounds through the car's speakers. The adapter provides the functionality of the transient chatrooms as discussed herein. Thus, any discussion herein as the vehicle performing specific operations may be a user computing device part of the vehicle or distinct from it.

Figure 2:
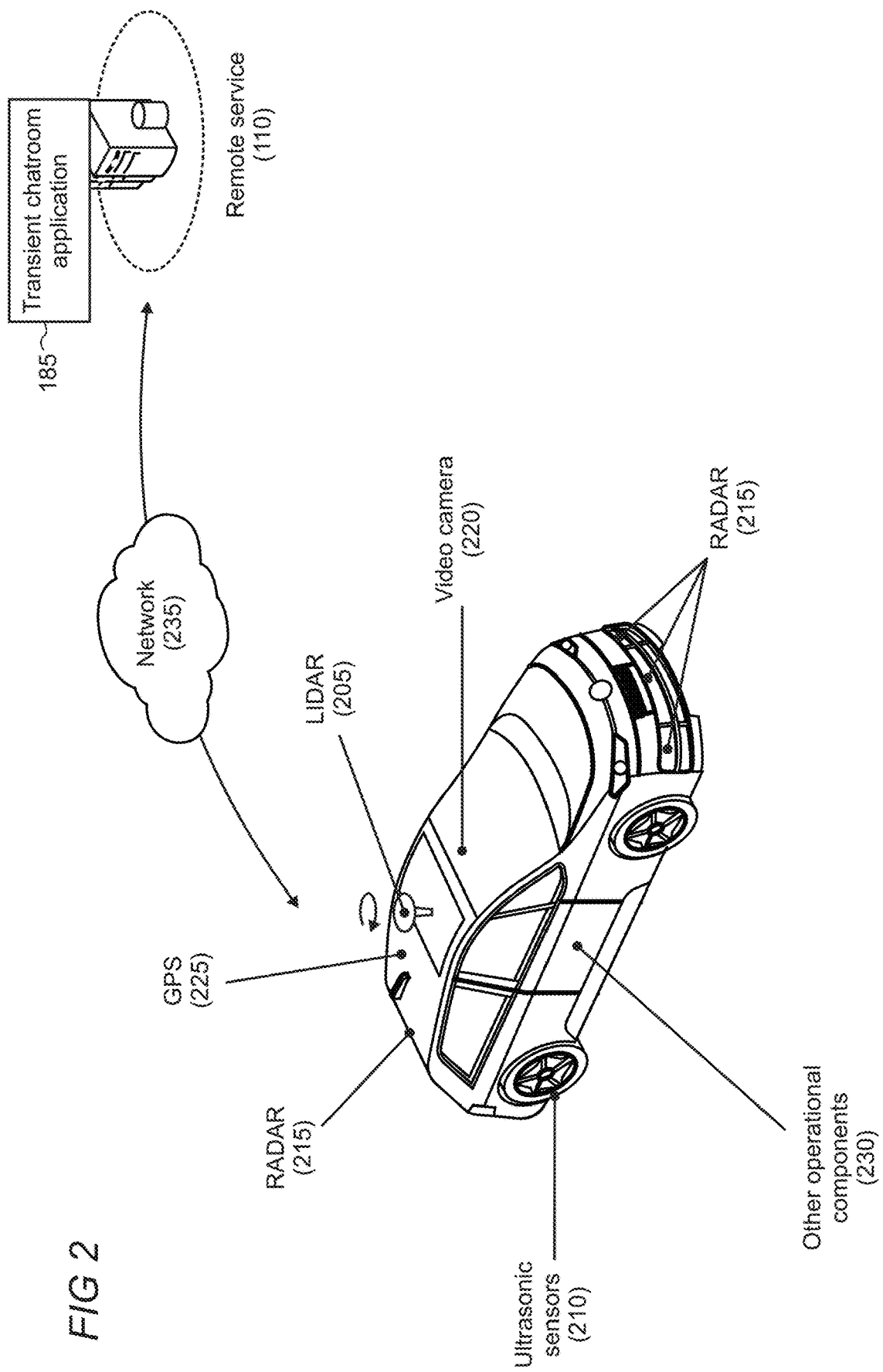
FIG. 2 shows an illustrative representation of the car's various hardware components.

FIG. 2 shows an illustrative representation in which the vehicle 105 is configured with driverless car components or otherwise is configured with sensors to detect vehicle traits. While a car is shown, this is exemplary only, and the current implementation may be utilized by various types of vehicles, such as motorcycles, trucks, motorized bikes, scooters, airplanes, etc. The vehicle is configured with LIDAR (Light Detection and Ranging) 205, ultrasonic sensors 210, radar 215, a video camera 220, GPS (global positioning system) 225, and other operational components 230.

The LIDAR unit 205 is constantly spinning and uses laser beams to generate a 360-degree image of the vehicle's surroundings. The radar 215 is implemented to measure the distance from the vehicle 105 to other obstacles. The video camera 220 may be used to measure the distance to various surrounding objects, detect traffic lights and signs, and recognize moving objects like pedestrians and bicyclists. The ultrasonic sensors 210 may also be utilized to measure the distance between objects, such as objects that are relatively close to the vehicle, such as curbs and other vehicles while parking. The various sensory devices may be used for a driverless car application and/or may be utilized in creating real-time transient virtual chatrooms. For example, such data may be transmitted over the network 235 to the remote service 110 for utilization by the transient chatroom application 185. The network can include a cellular network, a Wi-Fi connection, and may be any one or more of a local area network (LAN), wide area network (WAN), the Internet, etc.

Figure 3:
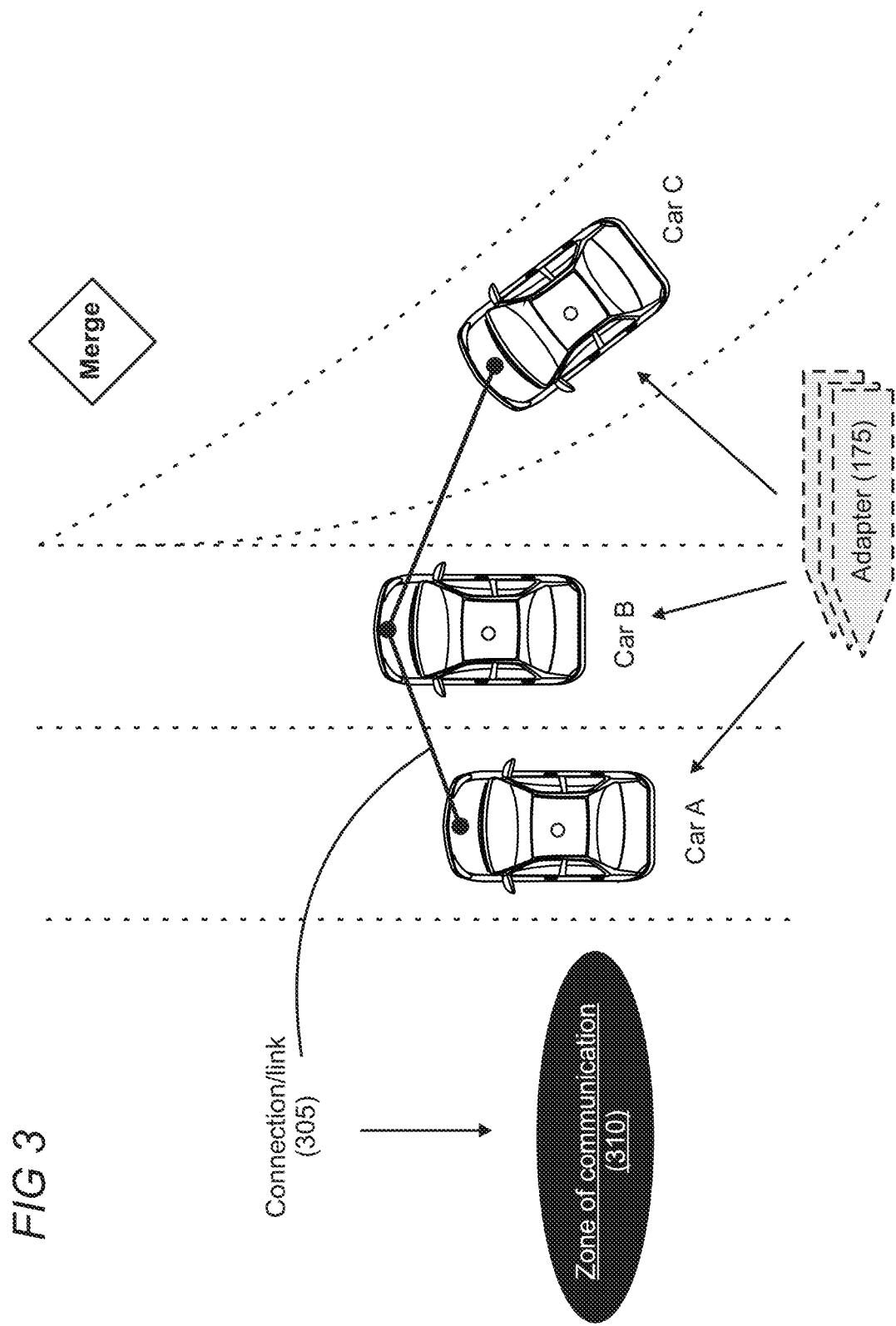
FIG. 3 shows an illustrative driving scenario in which a car is merging onto a highway.

FIG. 3 shows an illustrative representation of a driving scenario that can cause the creation of a transient virtual chatroom. In this exemplary representation, Car C is merging onto the highway or road which Cars A and B are on. The driving scenario (e.g., merging) is a situation that causes a connection/link 305 among the vehicles. As discussed below, other factors may also be at play, but FIG. 3 is meant as an exemplary driving scenario for the connection among vehicles. The connection or link among the vehicles is an indication that the vehicles are within a zone of communication 310 among each other and can therefore communicate. The zone of communication means that one or more factors are applicable such that one or more vehicles can communicate with each other, either through a virtual chatroom or over some short- or long-range communication protocol. The connection/link is further shown in subsequent drawings. The adapter 175 is shown to represent that while the vehicle's onboard computer system may be utilized to communicate with other vehicles, a distinct computing device, such as mobile devices 195, may alternatively be utilized.

Figure 4:
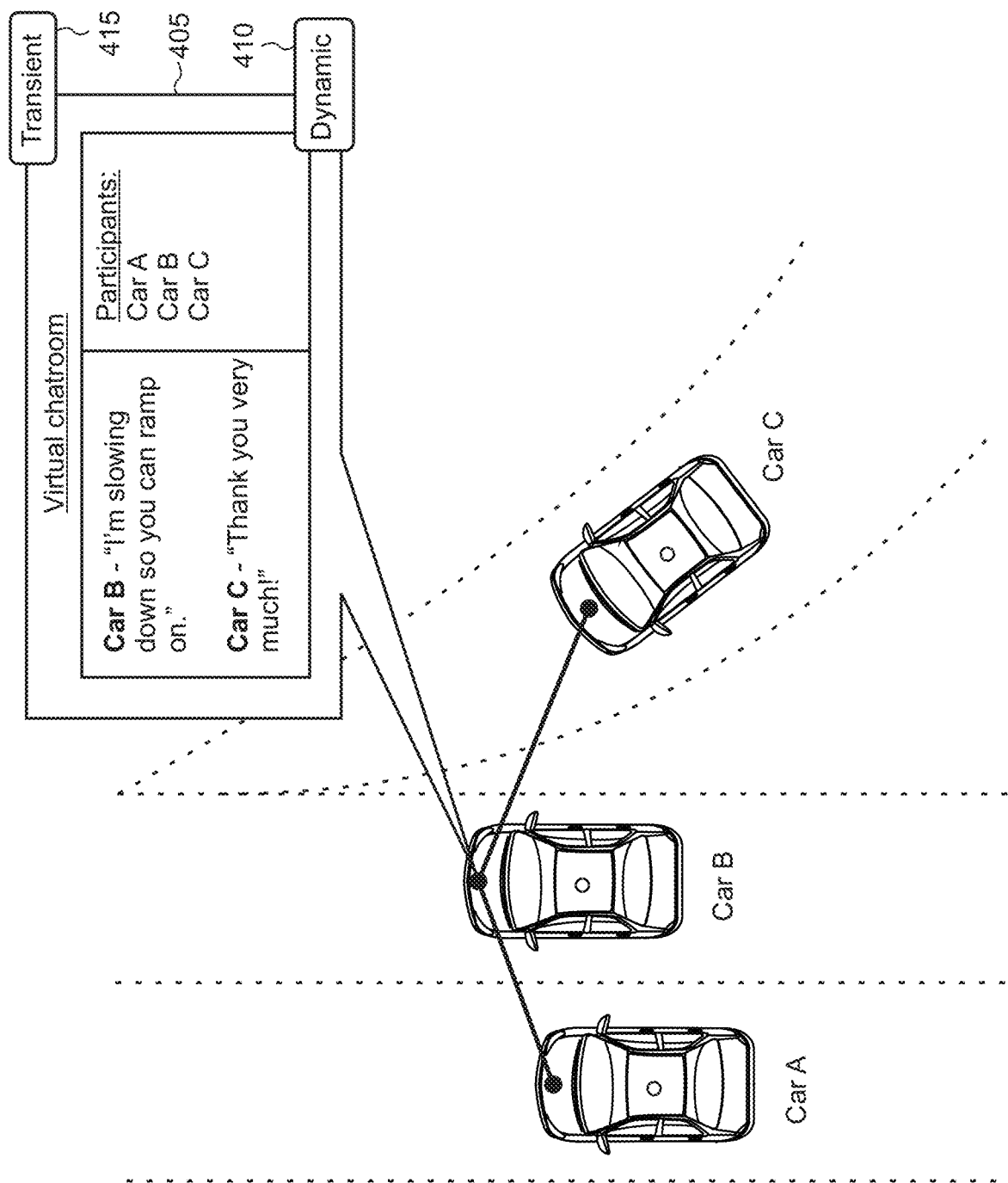
FIG. 4 is an illustrative transient virtual chatroom created among the cars within a zone of communication.

FIG. 4 shows an illustrative representation in which the merging driving scenario caused the creation of a virtual chatroom 405. The virtual chatroom may be transient 415 and dynamic 410. The transient aspect means that the chatroom is, at least in some implementations, temporary for the vehicles and to apply to a given driving scenario. However, the chatroom may alternatively have some permanency, but the vehicles enter and leave it. The dynamic aspect means that the virtual chatroom may dynamically include various vehicles, and other vehicles may leave. The virtual chatroom enables operators/drivers of the vehicles to communicate with one another. In this example, Car B preemptively tells Car C that he is slowing down so that Car C can safely merge, and Car C acknowledges the gesture.

Figure 5:
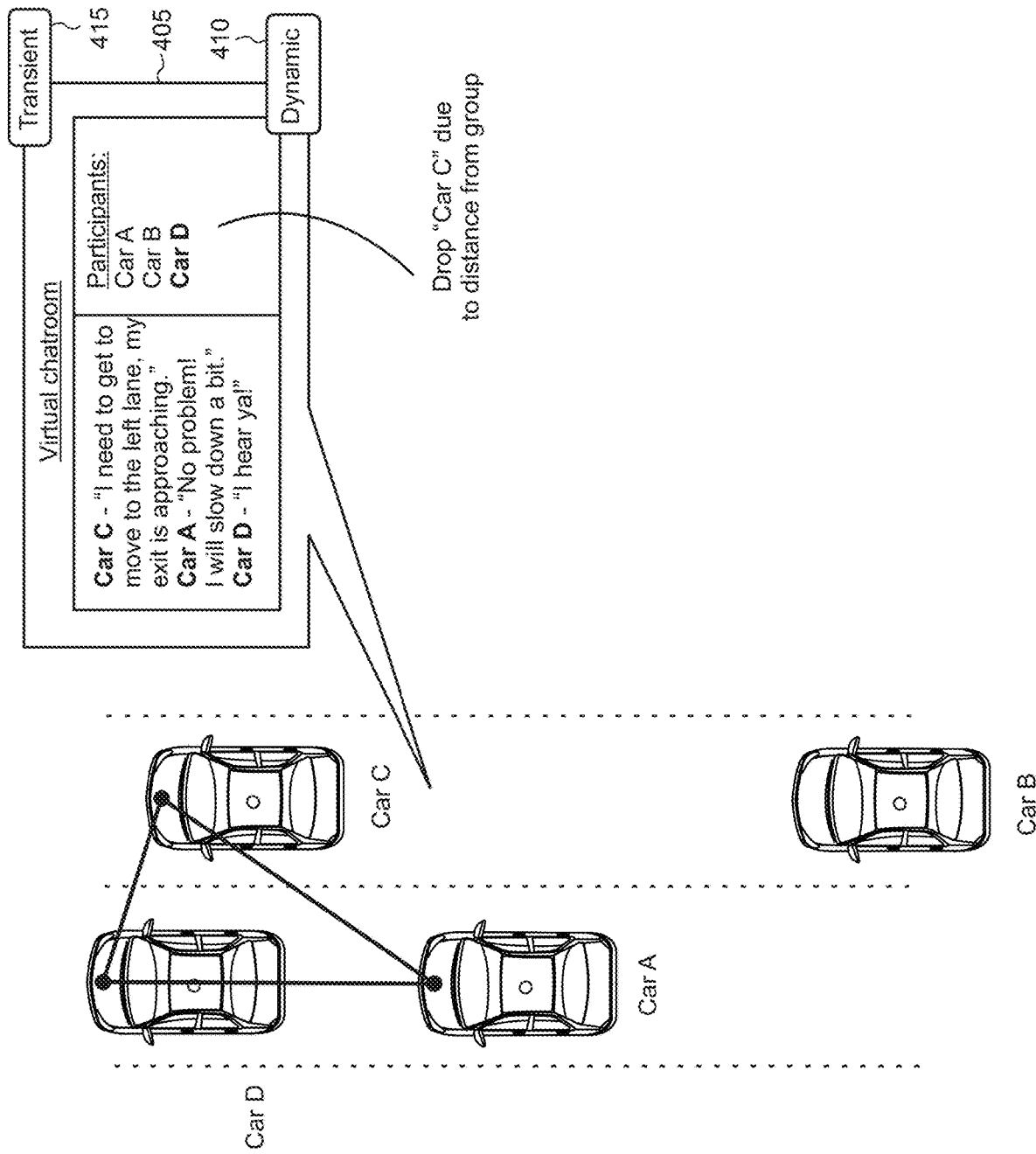
FIG. 5 shows an illustrative representation in which the transient virtual chatroom is dynamically updated.

FIG. 5 shows an illustrative representation in which the virtual chatroom 405 was updated based on an updated and current driving scenario. In this example, Car C was dropped from the virtual chatroom given its distance from the group of relatable vehicles. Car D was added to the virtual chatroom given its proximity or other similarity to the other vehicles. In this example, Car C conveys to the other cars that he needs to move to the left lane because his exit is approaching, and Cars A and D respond accordingly. This communication capability thereby makes the driving experience safer and reduces confrontation.

Figure 6:
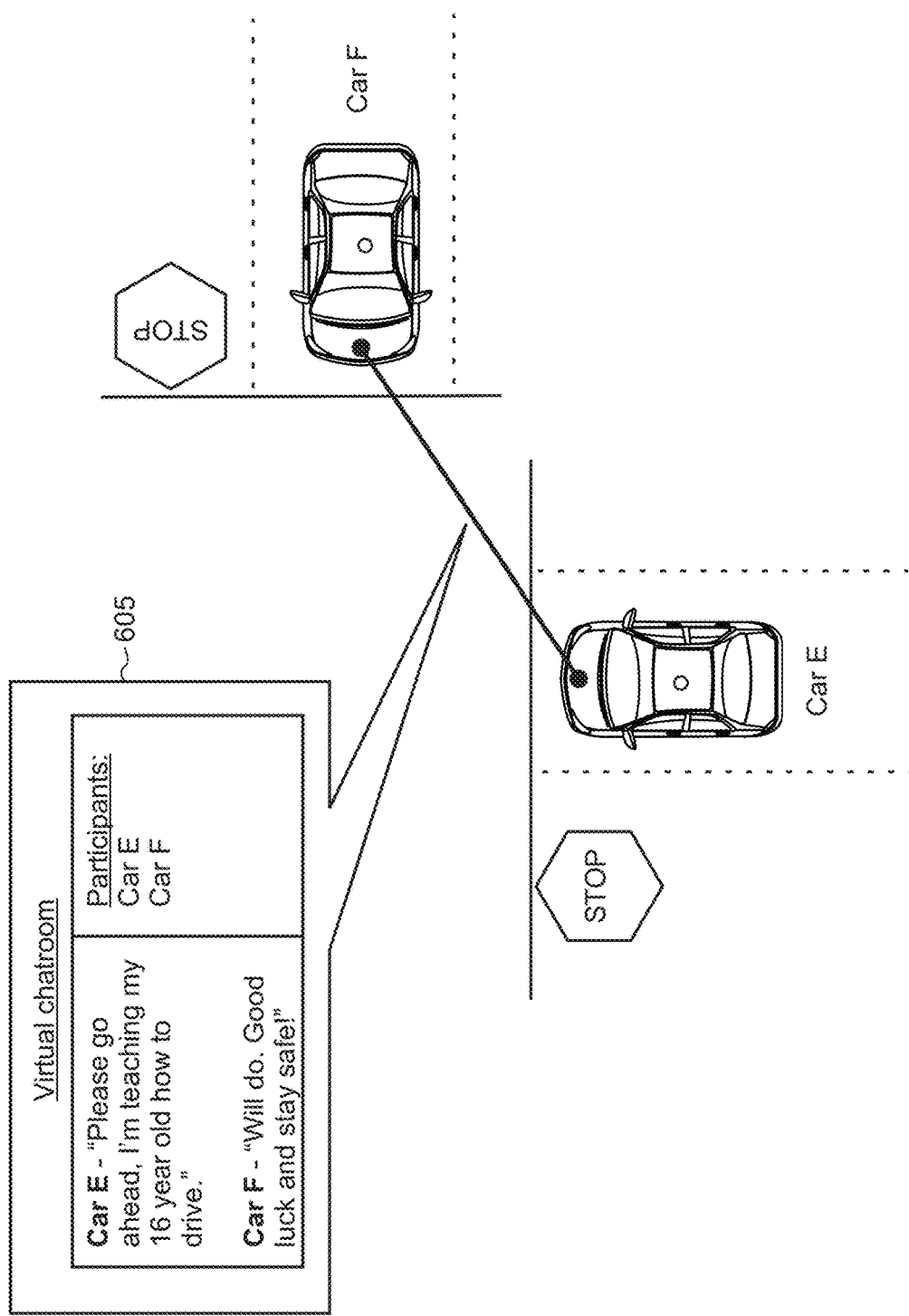
FIG. 6 shows an illustrative representation in which a transient virtual chatroom is created for a driving scenario in which cars are stopped at an intersection.

FIG. 6 shows an illustrative representation in which another driving scenario causes the creation of a virtual chatroom 605. Cars E and F are stopped at stop signs at a common intersection which is criteria that falls within a zone of communication among the vehicles. Put differently, the driving scenario of the vehicles satisfied the criteria for being within the zone of communication to each other. The transient virtual chatroom is then created responsive to the cars being within a zone of communication. In this example, the driver of Car E says to the driver of Car F to drive first since he is teaching his son how to drive. Such an interaction enhances safety and understanding between drivers.

Figure 7:
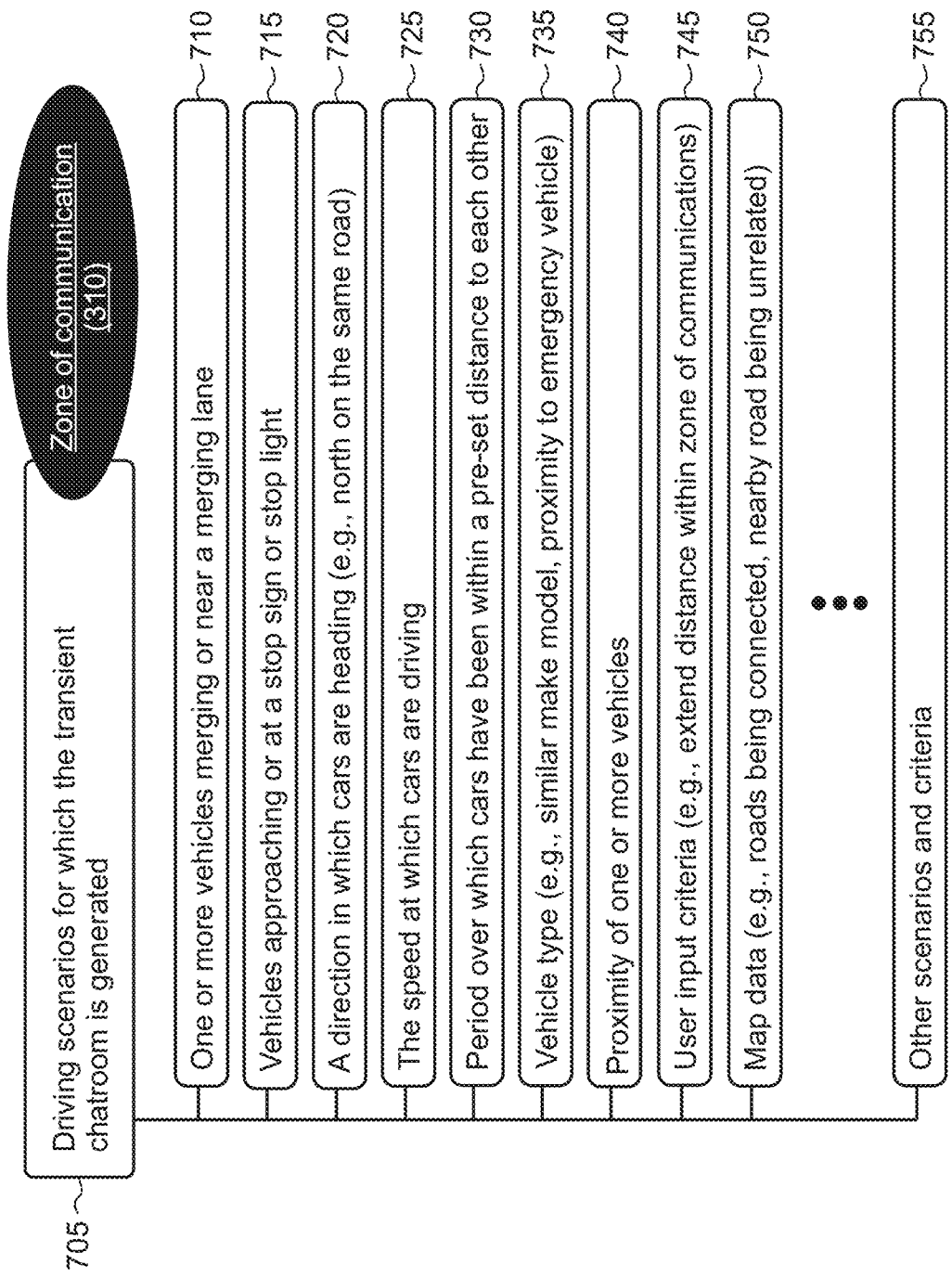
FIG. 7 shows an illustrative schema of driving scenarios in which transient virtual chatrooms can be created.

FIG. 7 shows an illustrative schema of driving scenarios for which transient virtual chatrooms can be generated, as representatively shown by numeral 705. Such driving scenarios may be considered putting drivers of respective vehicles within a zone of communication 310 of each other. Any of the driving scenarios shown in FIG. 7 or any other driving scenario described herein may be sufficient to put users within a zone of communication and, thereby, be applicable for being within a virtual chatroom together. Other driving scenarios not shown in FIG. 7 or described herein are also possible. Exemplary and non-exhaustive driving scenarios include one or more vehicles merging or near a merging lane 710; vehicles approaching or at a stop sign or stop light 715; a direction in which vehicles are heading (e.g., north on the same road) 720; the speed at which cars are driving 725; Period over which vehicles have been within a pre-set distance to each other (e.g., within 20 feet) 730; vehicle type (e.g., similar make or model, proximity to emergency vehicle) 735; the proximity of one or more vehicles 740; user input criteria (e.g., extend distance within a zone of communication) 745; map data (e.g., roads being connected, the nearby road being unrelated) 750; and other scenarios and criteria 755.

Figure 8:
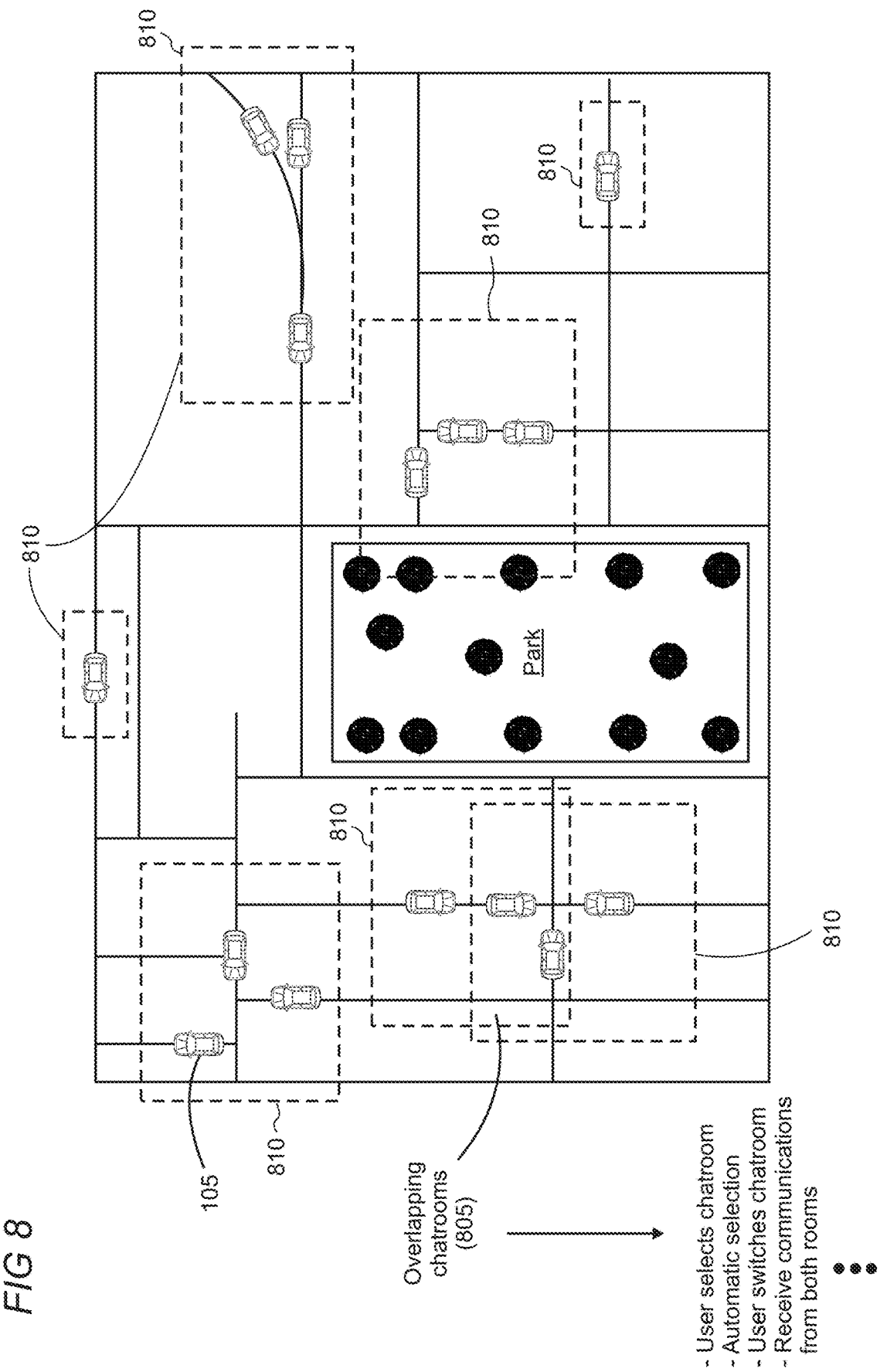
FIG. 8 shows an illustrative environment in which various transient virtual chatrooms are created for various vehicles within a zone of communication.

FIG. 8 shows an illustrative environment in which various vehicles 105 are within zones of communication and are within the same transient virtual chatroom 810. The dashed-broken lines represent a given virtual chatroom for the vehicles within that area. Individual or multiple vehicles may be within the same virtual chatrooms based on an applicable driving scenario. Occasionally, a vehicle may be invited into multiple transient virtual chatrooms if, for example, their given situation places them into two distinct driving scenarios involving distinct vehicles. When such overlapping chatrooms 805 are present, the user may have various options available to them. For example, the user may select a single chatroom using some input/output interface (e.g., voice-controlled speaker input, touchscreen display, a button, etc.), the vehicle may automatically place the user within a given chatroom, the user can switch between the chatrooms, or the user can receive communications from each chatroom.

Figure 9:
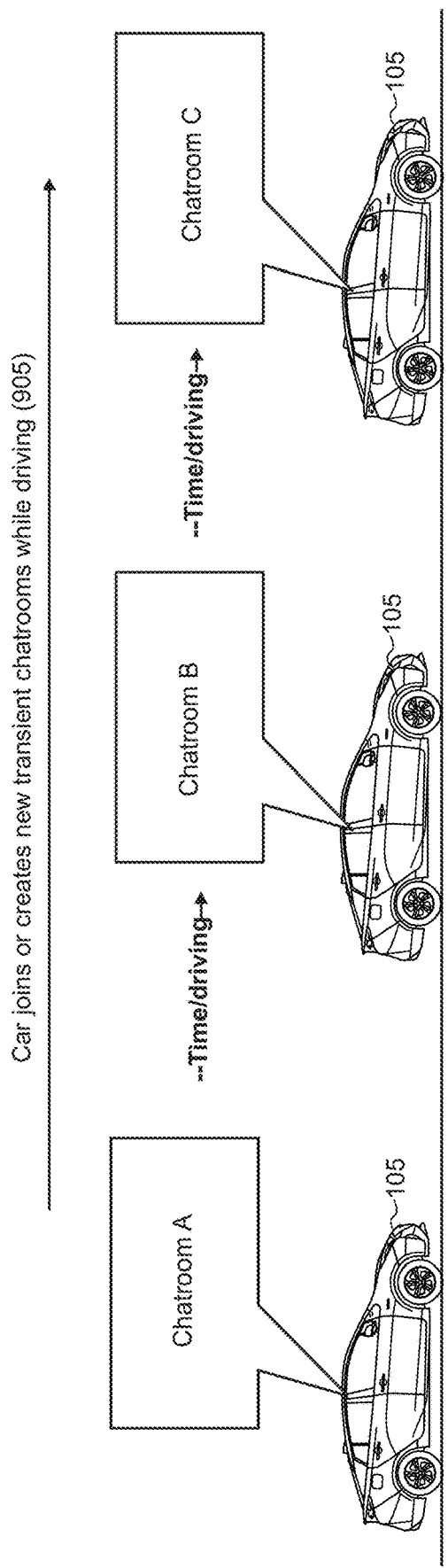
FIG. 9 shows an illustrative environment in which a single vehicle can dynamically join and transition between various chatrooms while driving.

FIG. 9 shows an illustrative representation in which the vehicle 105 joins or creates various transient virtual chatrooms while driving, as representatively shown by numeral 905. In this example, the vehicle starts in Chatroom A, and then as time passes and/or the vehicle continues to drive, the car advances to Chatroom B and then to Chatroom C.

Figure 10:
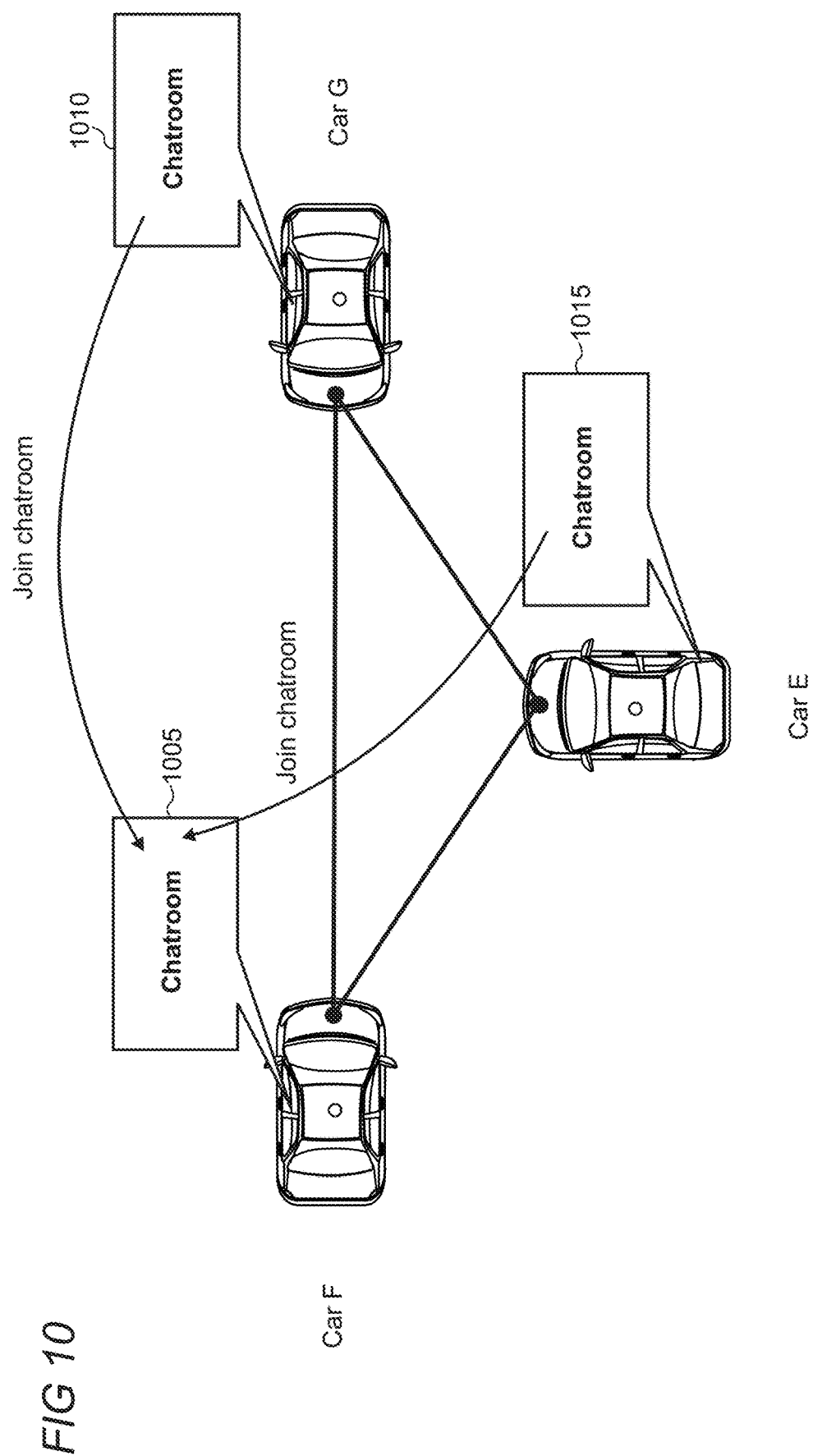
FIG. 10 shows an illustrative environment in which cars join a virtual chatroom hosted or associated with another car.

FIG. 10 shows an illustrative representation in which other vehicles join another vehicle's chatroom. Car F either locally or remotely hosts the chatroom, and upon the other vehicle's being within a zone of communication, Cars E and G join Car F's chatroom. The remotely-hosted chatroom may be hosted by the remote service 110 (FIG. 1), in which the remote service associates chatrooms to each vehicle. The chatrooms may be virtual objects within an installed application on the vehicle's computer system or the remote service or may be modes of communication, such as connections over Bluetooth®, Wi-Fi, NFC (near field communication), a cellular connection, etc. Thus any discussion of a chatroom may be a software instantiation that users can specifically join or may be a communication method or connection among vehicles.

Figure 11:
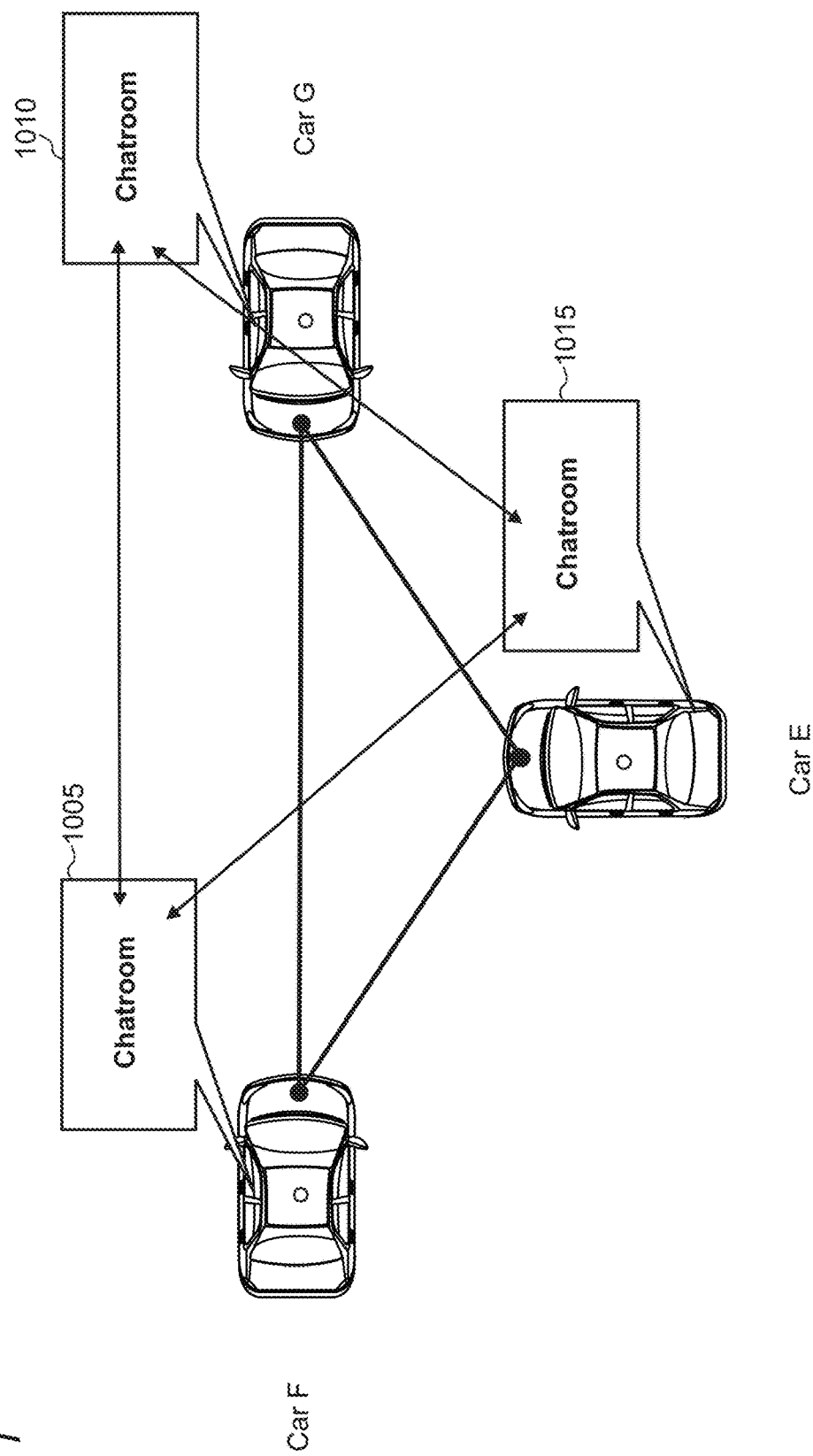
FIG. 11 shows an illustrative environment in which the virtual chatrooms associated with various cars are merged to enable communications among the drivers.

FIG. 11 shows an illustrative representation in which the chatrooms 1005, 1010, and 1015 associated with various vehicles are merged when vehicles are within a zone of communication to each other. Thus, each vehicle may have its own chatroom that becomes merged with another vehicle's chatroom when within a common zone of communication. Locally instantiated chatrooms may be chatrooms operating on an application installed in the vehicle's computer system or may be remotely hosted by the remote service.

Figure 12:
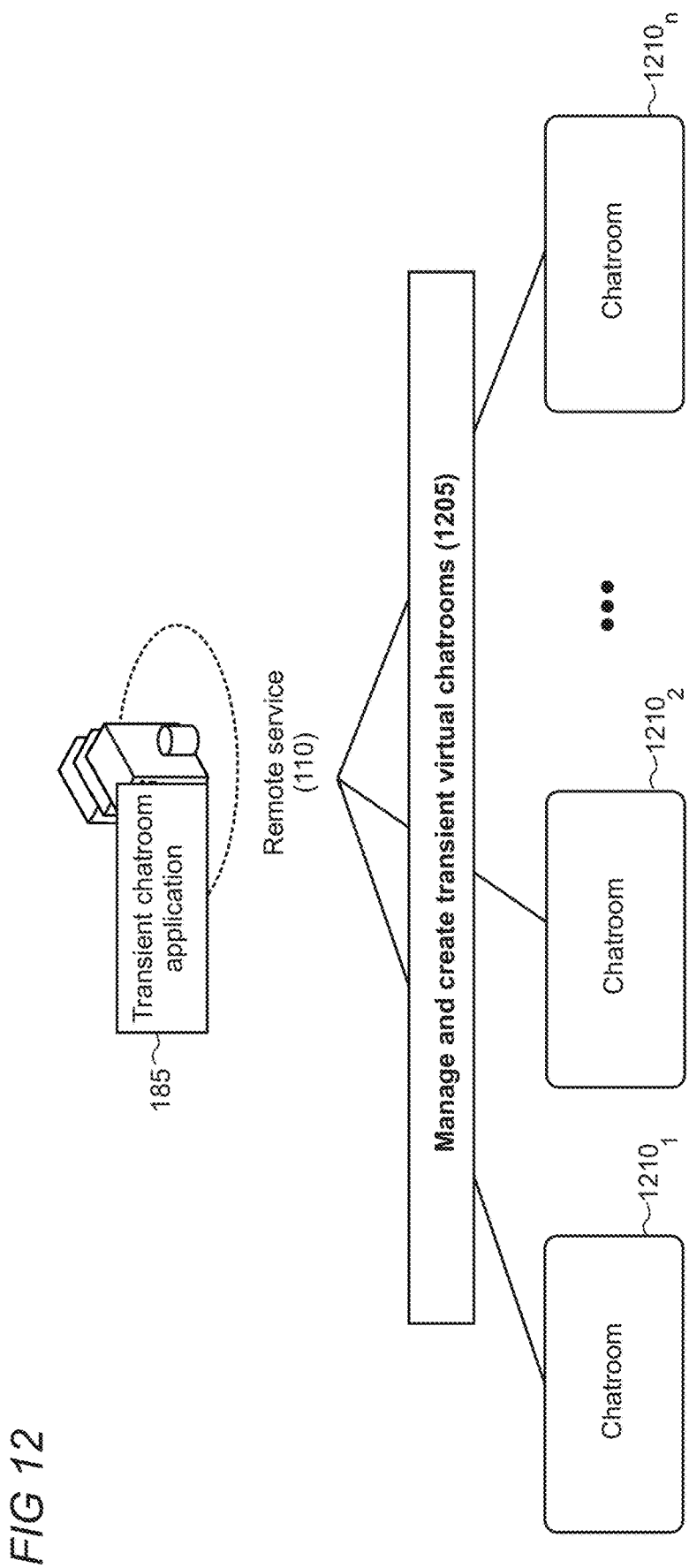
FIG. 12 shows an illustrative environment in which a remote service manages and creates the transient virtual chatrooms for vehicles.

FIG. 12 shows an illustrative environment in which the remote service 110, operating the transient chatroom application 185, manages and creates the transient virtual chatrooms, as representatively shown by numeral 1205. In this implementation, the vehicles may join the chatrooms 1210 hosted and managed by the remote service, and upon joining a chatroom, vehicles are able to communicate virtually. In typical scenarios, drivers may communicate through microphones and speakers for safety concerns, but other communication interfaces are also possible, such as texting, voice-to-text, haptic feedback, image transmissions, etc.

Figure 13:
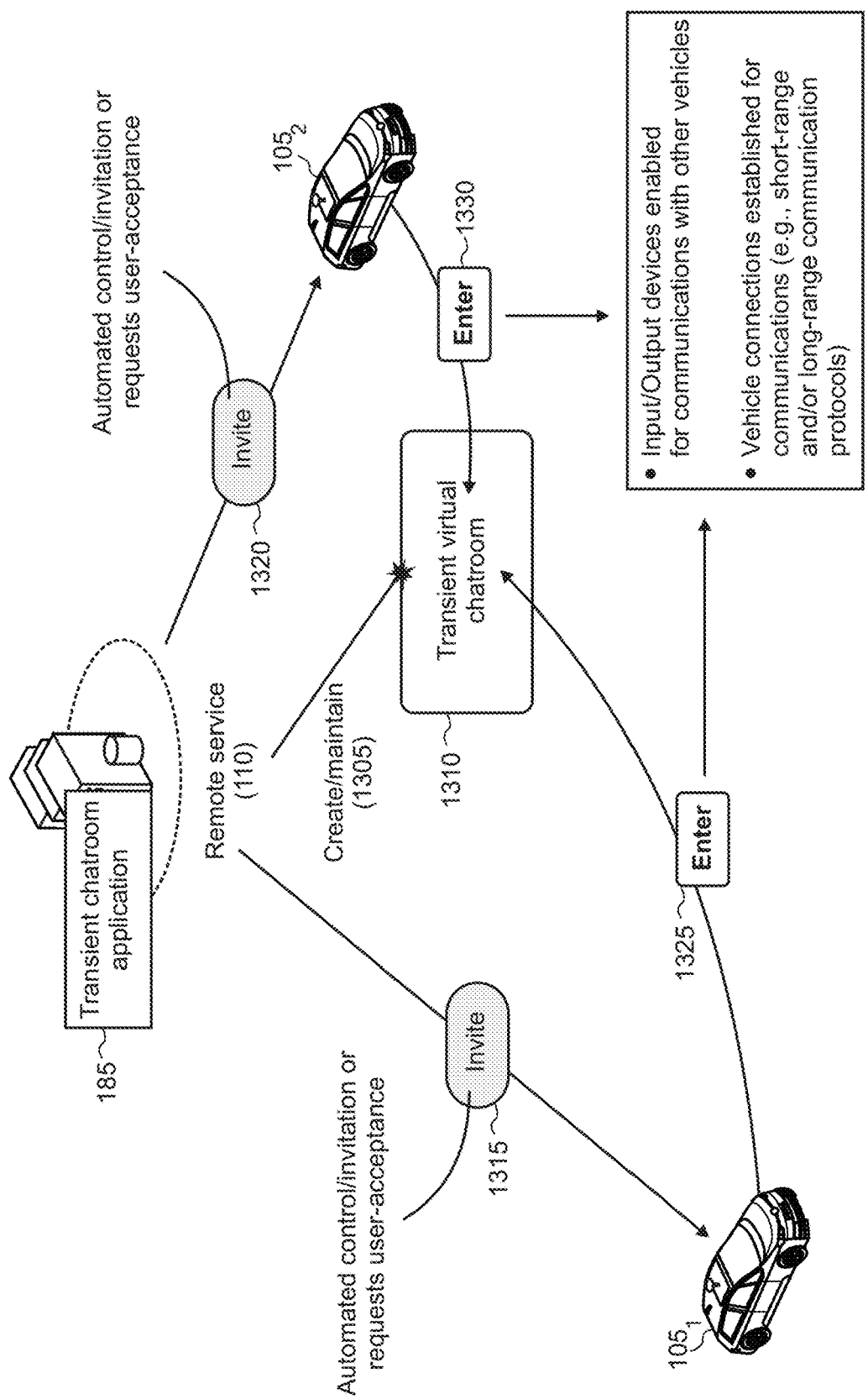
FIG. 13 shows an illustrative environment in which the remote service creates a transient virtual chatroom and dynamically invites vehicles to enter.

FIG. 13 shows an illustrative environment in which the remote service 110, operating the transient chatroom application 185, creates the transient virtual chatroom 1310, as representatively shown by numeral 1305. The transient virtual chatroom is created, for example, when the remote service detects that the vehicles 105 are within a zone of communication to each other based on the driving scenario. The remote service may automatically invite 1315, 1320 the vehicles into the virtual chatroom. Responsive to receiving the invite, the vehicles may enter 1325, 1330 the virtual chatroom 1310. For example, the vehicles may be configured to accept the invite and enter the chatroom automatically or may alternatively accept the invitation before entering the chatroom. The automated or manual acceptance may depend on the specific implementation based on user configuration in their locally instantiated transient chatroom application 185 (FIG. 1).

When the vehicles 105 enter the transient virtual chatroom 1310, various configurations are triggered. For example, responsive to joining the chatroom, the vehicle's input/output devices are enabled, such as speakers and microphone, a touchscreen display, etc. Furthermore, the vehicle's connections are established for communications, enabling short-range (e.g., NFC, Bluetooth®) and long-range communication protocols (e.g., cellular connectivity). In some implementations, the short- or long-range communication protocols may already be intact before entering the chatroom since the vehicle communicates with the remote service to utilize the transient chatroom application system. When the virtual chatrooms or communications are locally operated at the vehicle's associated computer system, the vehicle connections may be established once a vehicle enters a chatroom.

Figure 14:
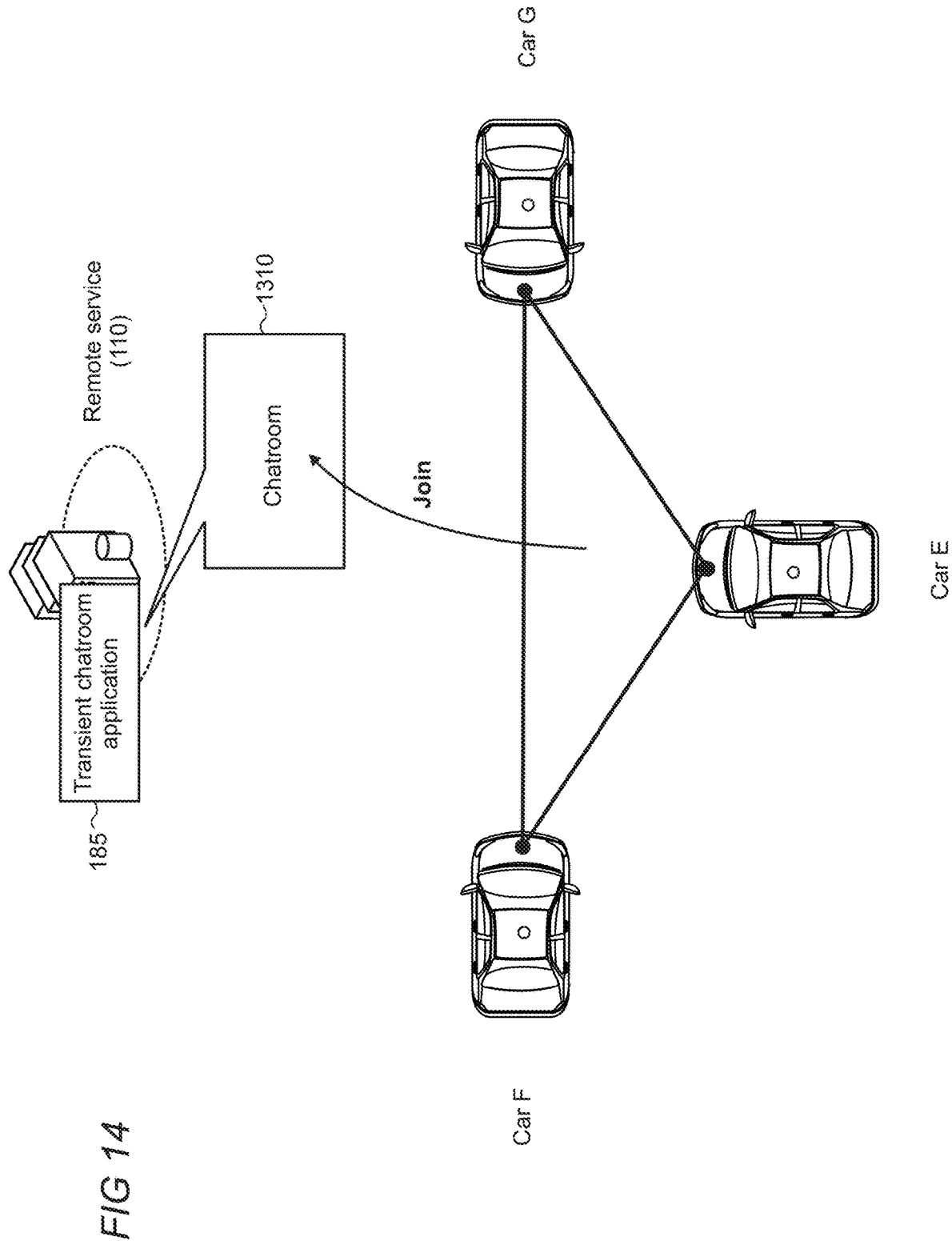
FIG. 14 shows an illustrative environment in which vehicles enter the transient virtual chatroom hosted, created, and managed by the remote service.
Figure 16:
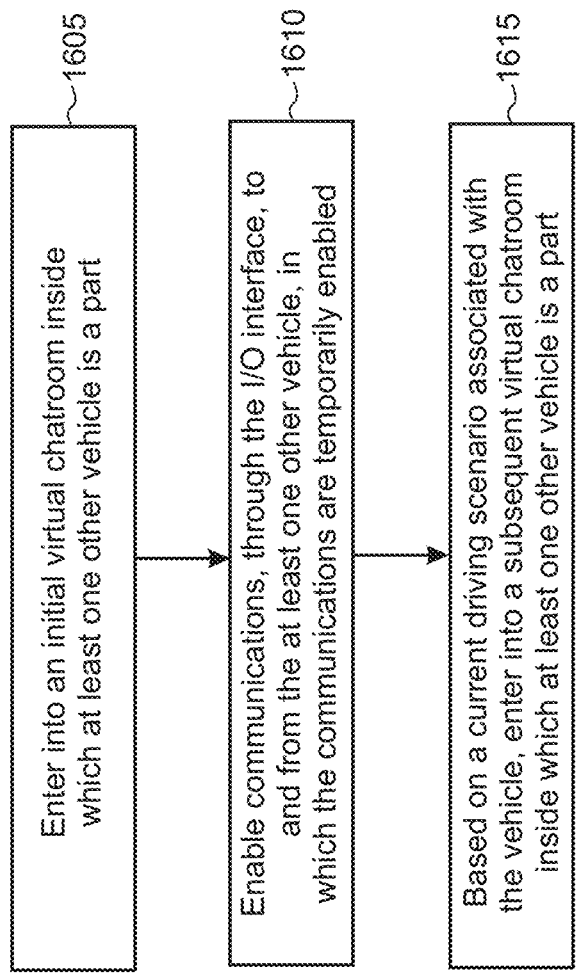
Figure 17:
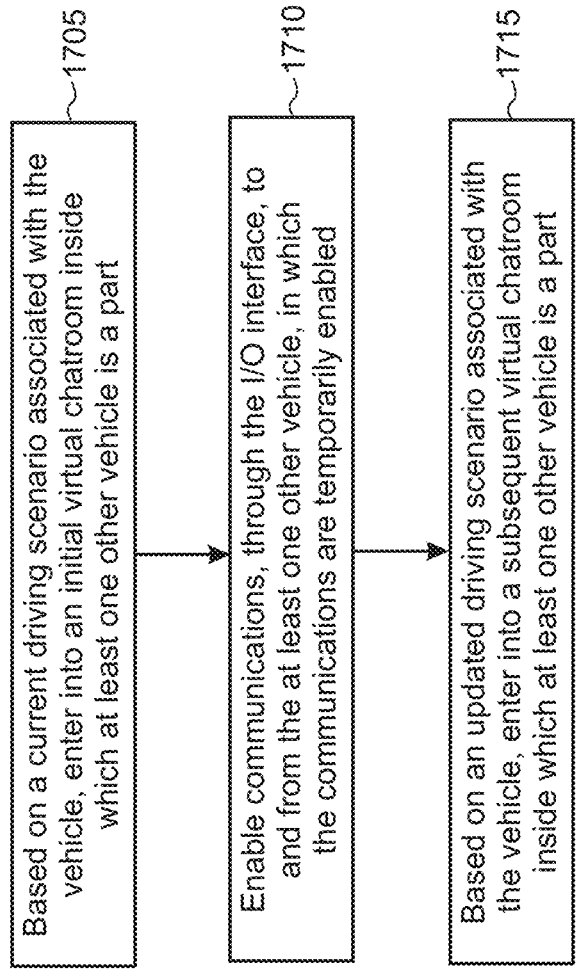
Figure 18:
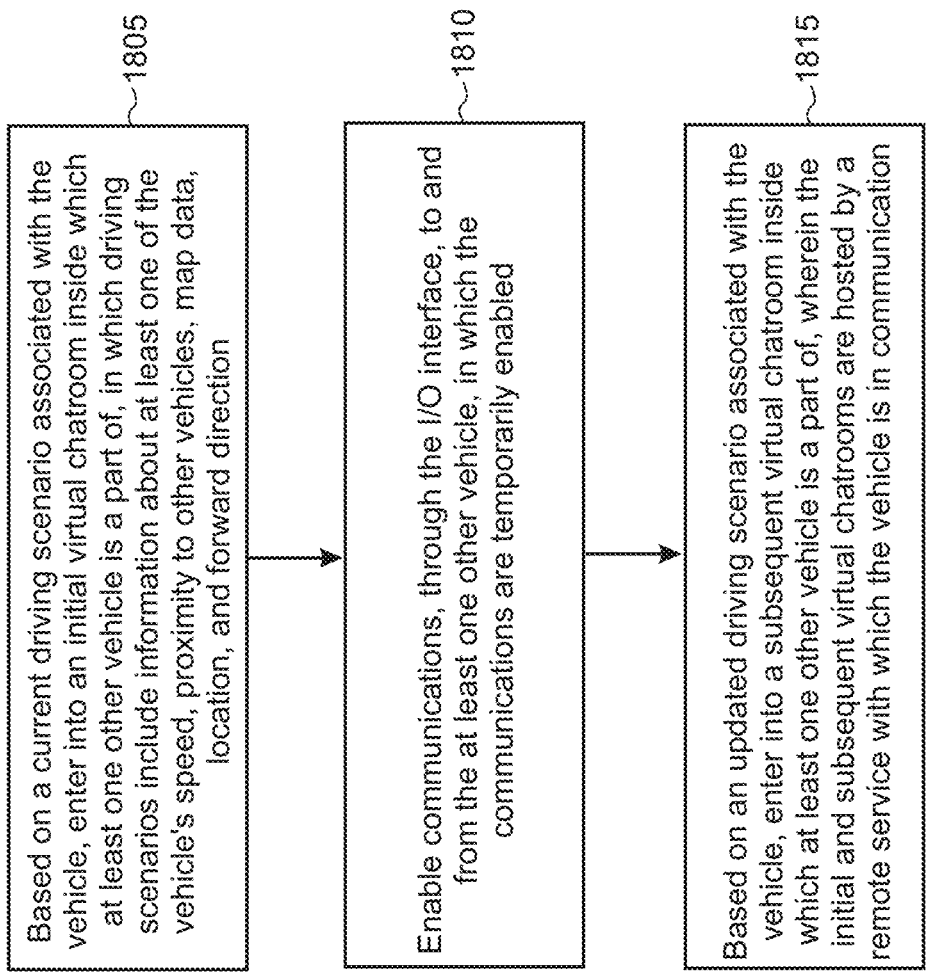

FIG. 14 shows an illustrative representation in which the vehicles, Cars E, F, and G, join the virtual chatroom 1310 hosted by the remote service. For example, the cars may enter the chatroom, responsive to receiving an invitation from the remote service.

FIGS. 15-18 show various illustrative processes that may be operated by one or more of a remote service, a vehicle's computer system, or a computing device associated with a vehicle. Such steps are exemplary only, and the specific order may be re-arranged based on a given scenario. The steps in the processes may be performed by any one or more of the remote service, vehicle's onboard computer system, an adapter computing device, or a user's mobile computing device, such as his smartphone.

In step 1505 in process 1500, the vehicle travels down a roadway. In step 1510, criteria are set for determining how and when vehicles join a transient virtual chatroom. Such criteria may be, for example, given driving scenarios such as those shown and described with respect to FIGS. 3-7. The criteria may be set on the user's local computing device (e.g., the vehicle's computer system, a user's mobile computing device operating the transient chatroom application, or a combination of the two). In step 1515, the remote service, vehicle, or mobile device operating the transient chatroom application assesses whether vehicles fall within the set criteria, thereby within a communication zone. For example, the remote service may determine whether one or more vehicles are within the zone of communication to each other, or local vehicles may negotiate with other nearby vehicles to determine if they are within a zone of communication to each other.

In step 1520, one or more vehicles join a transient virtual chatroom when identified vehicles fall within the set criteria and thereby a zone of communication. In step 1525, communications are enabled for the vehicles that join the transient virtual chatroom. Communications are enabled by the respective vehicles enabling short- or long-range communication protocols or enabling input/output interfaces. In step 1530, the remote service or local vehicles continuously assess whether other vehicles are within the set criteria and zone of communication. The continued assessment causes chatrooms and communications to update as vehicles move and driving scenarios change. In step 1535, a vehicle leaves or joins transient virtual chatrooms based on the continued assessment. For example, a given vehicle may exit a chatroom once it is no longer pertinent to the driving scenario in that chatroom or may enter a new chatroom based on an updated situation.

In step 1540, the vehicle may enable user controls over leaving and joining chatrooms or utilize automated functions. For example, the vehicle's operator may manually accept leaving a chatroom or entering a new chatroom, such as by pressing some input on a touchscreen or vocally providing an input received at the vehicle's microphone. Alternatively, the user's transient chatroom application may automatically enter and leave chatrooms based on updated driving scenarios. Whether such updates are manually approved by the user or automated, the vehicle may output a sound or provide some feedback, so the user knows that they have just left a chatroom or entered a new chatroom. For example, the feedback may be a beeping sound or a notification, such as "new chatroom" being output through a speaker. In step 1545, the vehicle ceases to join the transient chatroom upon some conditions, such as responsiveness to the user's request, switching the car off, etc.

In step 1605 in process 1600, a vehicle enters an initial virtual chatroom inside which at least one other vehicle is a part. In step 1610, the vehicle enables communications, through an I/O (input/output) interface, to and from the at least one other vehicle, in which the communications are temporarily enabled. In step 1615, based on a current driving scenario associated with the vehicle, the vehicle enters into a subsequent virtual chatroom inside which at least one other vehicle is a part.

In step 1705 in process 1700, based on a current driving scenario associated with the vehicle, enter into an initial virtual chatroom inside which at least one other vehicle is a part. In step 1710, the vehicle enables communications, through the I/O interface, to and from the at least one other vehicle, in which the communications are temporarily enabled. In step 1715, based on an updated driving scenario associated with the vehicle, the vehicle enters into a subsequent virtual chatroom inside which at least one other vehicle is a part.

In step 1805 in process 1800, based on a current driving scenario associated with the vehicle, a computer system associated with the vehicle enters into an initial virtual chatroom inside which at least one other vehicle is a part, in which driving scenarios include information about at least one of the vehicle's speed, proximity to other vehicles, map data, location, and forward direction. In step 1810, the computer system enables communications, through the I/O interface, to and from the at least one other vehicle, in which the communications are temporarily enabled. In step 1815, based on an updated driving scenario associated with the vehicle, the computer system enters into a subsequent virtual chatroom inside which at least one other vehicle is a part, wherein the initial and subsequent virtual chatrooms are hosted by a remote service with which the vehicle is in communication.

Figure 19:
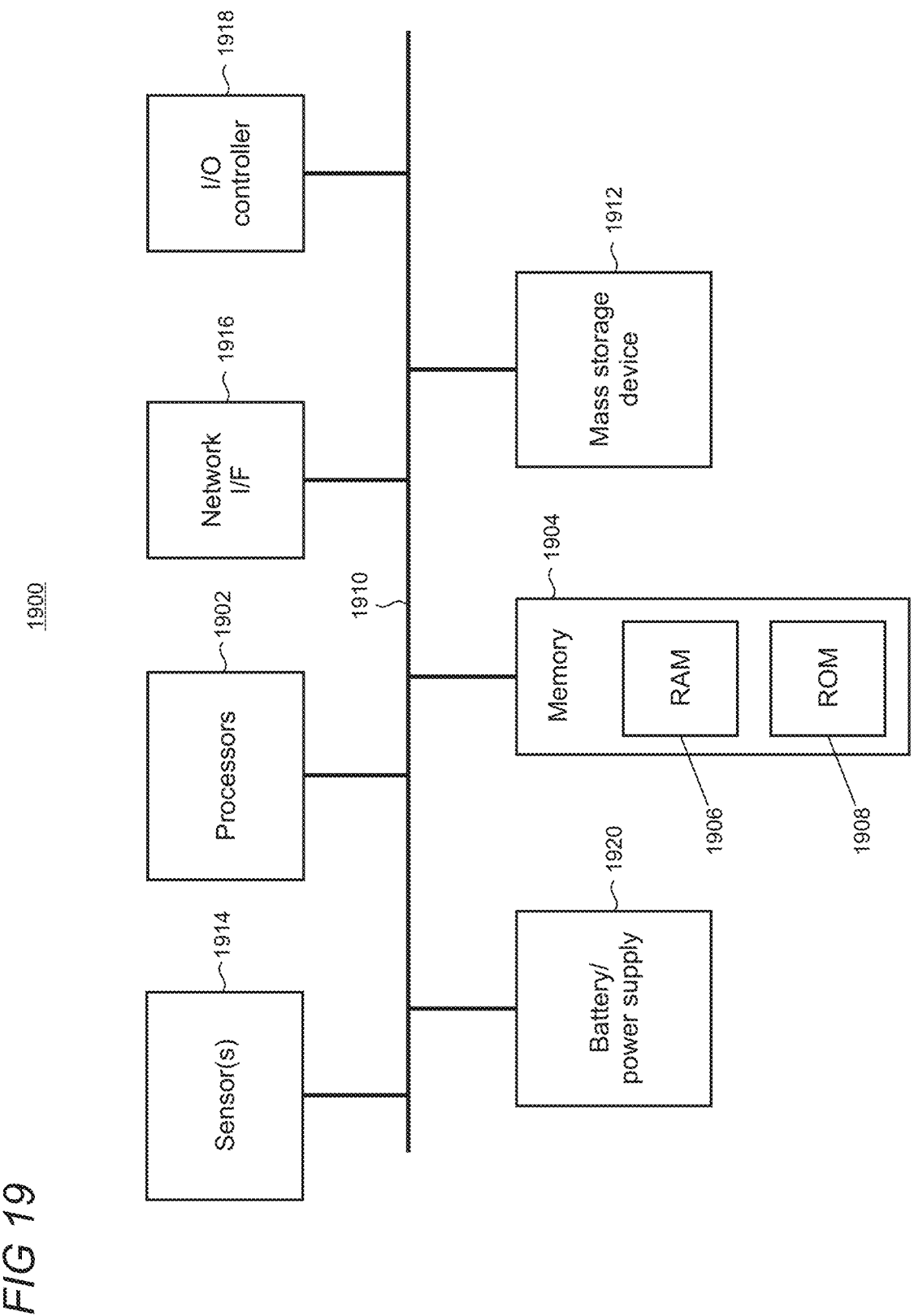
FIG. 19 is a simplified block diagram of an illustrative architecture of a computing device that may be used at least in part to implement the present transient chatrooms adapted to provide communications among drivers.

FIG. 19 shows an illustrative diagram of a computer system that may be utilized by the vehicle's computer system to perform the operations herein, or a distinct computing device or adapter that plugs into the vehicle or otherwise is associated with the vehicle. The adapter or separate computing device may be used with the vehicle or a standalone device and application that enables the user to utilize the features herein with, for example, a legacy vehicle that may not be able to download a transient chatroom application.

The architecture 1900 illustrated in FIG. 19 includes one or more processors 1902 (e.g., central processing unit, dedicated Artificial Intelligence chip, graphics processing unit, etc.), a system memory 1904, including RAM (random access memory) 1906 and ROM (read-only memory) 1908, and a system bus 1910 that operatively and functionally couples the components in the architecture 1900. A basic input/output system containing the basic routines that help to transfer information between elements within the architecture 1900, such as during startup, is typically stored in the ROM 1908. The architecture 1900 further includes a mass storage device 1912 for storing software code or other computer-executed code that is utilized to implement applications, the file system, and the operating system. The mass storage device 1912 is connected to the processor 1902 through a mass storage controller (not shown) connected to the bus 1910. The mass storage device 1912 and its associated computer-readable storage media provide non-volatile storage for the architecture 1900. Although the description of computer-readable storage media contained herein refers to a mass storage device, such as a hard disk or CD-ROM drive, it may be appreciated by those skilled in the art that computer-readable storage media can be any available storage media that can be accessed by the architecture 1900.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVD, HD-DVD (High Definition DVD), Blu-ray, or other optical storage, a magnetic cassette, magnetic tape, magnetic disk storage or other magnetic storage device, or any other medium which can be used to store the desired information and which can be accessed by the architecture 1900.

According to various embodiments, the architecture 1900 may operate in a networked environment using logical connections to remote computers through a network. The architecture 1900 may connect to the network through a network interface unit 1916 connected to the bus 1910. It may be appreciated that the network interface unit 1916 also may be utilized to connect to other types of networks and remote computer systems. The architecture 1900 also may include an input/output controller 1918 for receiving and processing input from a number of other devices, including a keyboard, mouse, touchpad, touchscreen, control devices such as buttons and switches, or electronic stylus (not shown in FIG. 19). Similarly, the input/output controller 1918 may provide output to a display screen, user interface, a printer, or other output device types (also not shown in FIG. 19).

It may be appreciated that the software components described herein may, when loaded into the processor 1902 and executed, transform the processor 1902 and the overall architecture 1900 from a general-purpose computing system into a special-purpose computing system customized to facilitate the functionality presented herein. The processor 1902 may be constructed from any number of transistors or other discrete circuit elements, which may individually or collectively assume any number of states. More specifically, the processor 1902 may operate as a finite-state machine in response to executable instructions contained within the software modules disclosed herein. These computer-executable instructions may transform the processor 1902 by specifying how the processor 1902 transitions between states, thereby transforming the transistors or other discrete hardware elements constituting the processor 1902.

Encoding the software modules presented herein also may transform the physical structure of the computer-readable storage media presented herein. The specific transformation of physical structure may depend on various factors in different implementations of this description. Examples of such factors may include but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1900 may further include one or more sensors 1914 or a battery or power supply 1920. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1900 in order to store and execute the software components presented herein. It also may be appreciated that the architecture 1900 may include other types of computing devices, including wearable devices, handheld computers, embedded computer systems, smartphones, PDAs, and other types of computing devices known to those skilled in the art. It is also contemplated that the architecture 1900 may not include all of the components shown in FIG. 19, may include other components that are not explicitly shown in FIG. 19, or may utilize an architecture completely different from that shown in FIG. 19.

Figure 20:
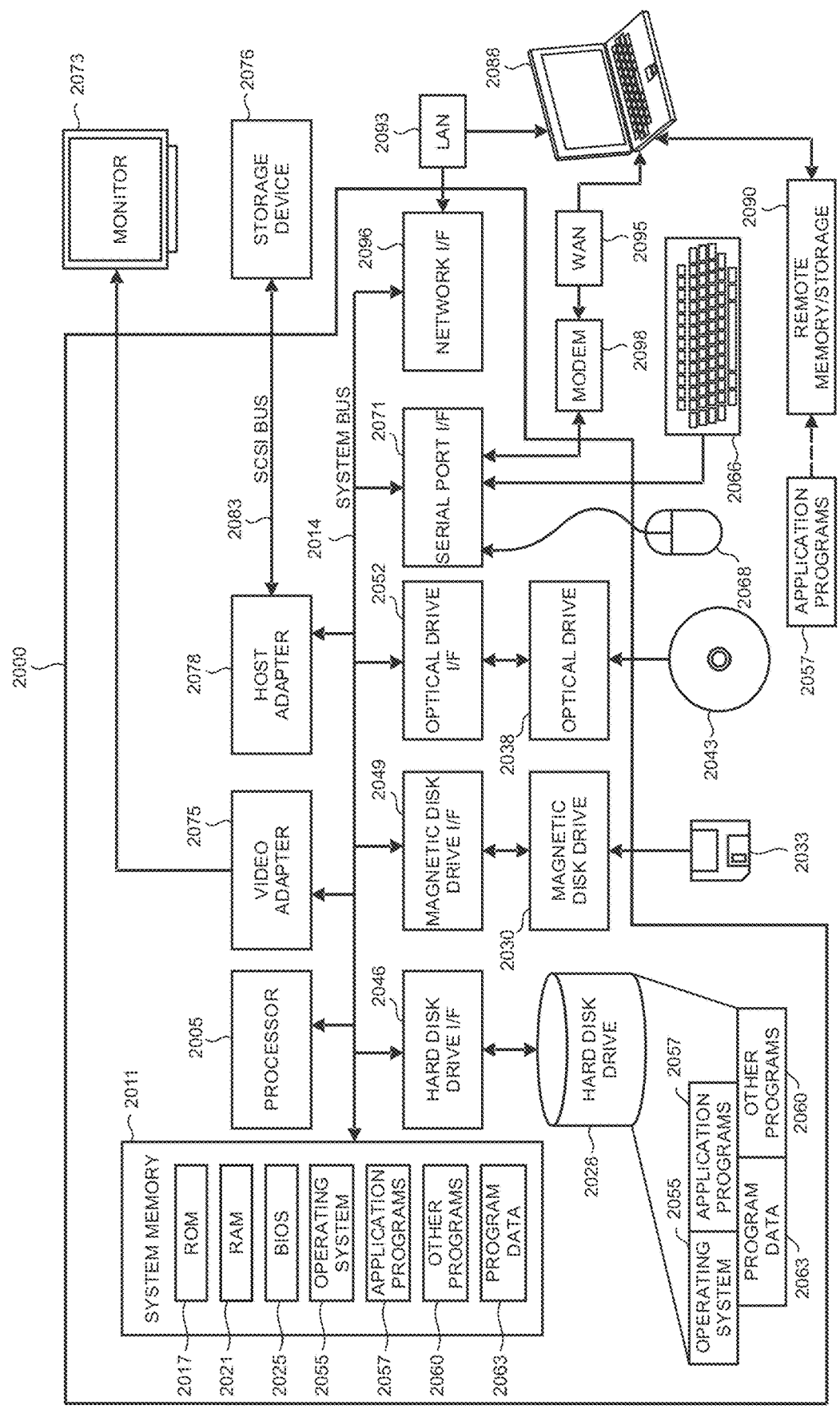
FIG. 20 is a simplified block diagram of an illustrative remote computing device, remote service, or computer system that may be used in part to implement the present transient chatrooms adapted to provide communications among drivers.

FIG. 20 is a simplified block diagram of an illustrative computer system 2000 such as a PC (personal computer), laptop computer, the vehicle's onboard computer system, or server (such as remote service 110) with which the present transient chatrooms adapted to provide communications among drivers may be implemented.

Computer system 2000 includes a processor 2005, a system memory 2011, and a system bus 2014 that couples various system components including the system memory 2011 to the processor 2005. The system bus 2014 may be any of several types of bus structures, including a memory bus or memory controller, a peripheral bus, or a local bus using any of a variety of bus architectures. The system memory 2011 includes read-only memory (ROM) 2017 and random-access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from, or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read-only memories (ROMs), and the like may also be used in some applications of the present transient chatrooms adapted to provide communications among drivers. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof are intended to cover non-transitory embodiments and do not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, gamepad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014 but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative, and other means of establishing a communications link between the computers may be used depending on the specific requirements of an application of the present transient chatrooms adapted to provide communications among drivers.

Various exemplary embodiments are disclosed herein. In one exemplary embodiment, disclosed is a computing device associated with a vehicle, the computing device adapted to enable virtual communications with other vehicle computing devices, comprising: one or more processors; an input/output (I/O) interface; and one or more hardware-based memory devices storing computer-readable instructions which, when executed by the one or more processors, cause the dialysis machine to: enter into an initial virtual chatroom inside which at least one other vehicle is a part; enable communications, through the I/O interface, to and from the at least one other vehicle, in which the communications are temporarily enabled; and based on a current driving scenario associated with the vehicle, enter into a subsequent virtual chatroom inside which at least one other vehicle is a part.

In another example, the I/O interface includes one or more of a speaker, microphone, display screen, or touchscreen. As another example, the initial and subsequent virtual chatrooms are hosted by a remote service with which the vehicle is in communication. In that example, the remote service invites the vehicle into the initial and subsequent virtual chatrooms to enable communications with other distinct vehicles. In a further example, the vehicle automatically enters at least one of the initial or subsequent virtual chatrooms responsive to receiving the remote service's invitations. In a further example, the vehicle accepts the remote service's invitation before entering at least one of the initial or subsequent chatrooms. As another example, at least one of the initial or subsequent virtual chatrooms are locally hosted on the vehicle's computer hardware, the at least one other vehicle's computer hardware, or a combination of both. In that example, the vehicle and the at least one other vehicle communicate over a short-range communication protocol. As a further example, the short-range communication protocol includes any one or more of Bluetooth®, NFC (near field communication), or Wi-Fi. In another example, the vehicle invites the at least one other vehicle to its locally hosted virtual chatroom. In another example, each vehicle is configured to host its own virtual chatroom with other vehicles, such that either virtual chatrooms among distinct vehicles merge, or specific vehicles are invited into another vehicle's virtual chatroom. As another example, the vehicle enters virtual chatrooms using computer hardware that is part of the vehicle, or a computing device adapter that connects to the vehicle.

In another exemplary embodiment, disclosed is a method performed by a computing device associated with a vehicle, comprising: based on a current driving scenario associated with the vehicle, entering into an initial virtual chatroom inside which at least one other vehicle is a part of, in which driving scenarios include information about at least one of the vehicle's speed, proximity to other vehicles, map data, location, and forward direction; enabling communications, through the I/O interface, to and from the at least one other vehicle, in which the communications are temporarily enabled; and based on an updated driving scenario associated with the vehicle, entering into a subsequent virtual chatroom inside which at least one other vehicle is a part. In another example, the initial and subsequent virtual chatrooms are hosted by a remote service with which the vehicle is in communication. In that example, the remote service invites the vehicle into the initial and subsequent virtual chatrooms to enable communications with other distinct vehicles. As another example, the vehicle automatically enters at least one of the initial or subsequent virtual chatrooms responsive to receiving the remote service's invitations. In another example, at least one of the initial or subsequent virtual chatrooms are locally hosted on the vehicle's computer hardware, the at least one other vehicle's computer hardware, or a combination of both.

In another exemplary embodiment, disclosed is one or more hardware-based non-transitory computer-readable memory devices disposed in a medical device, the computer-readable instructions, when executed by one or more processors, cause the medical device to: based on a current driving scenario associated with the vehicle, enter into an initial virtual chatroom inside which at least one other vehicle is a part of, in which driving scenarios include information about at least one of the vehicle's speed, proximity to other vehicles, map data, location, and forward direction; enable communications, through the I/O interface, to and from the at least one other vehicle, in which the communications are temporarily enabled; and based on an updated driving scenario associated with the vehicle, enter into a subsequent virtual chatroom inside which at least one other vehicle is a part, wherein the initial and subsequent virtual chatrooms are hosted by a remote service with which the vehicle is in communication. In a further example, the vehicle enters virtual chatrooms using computer hardware that is part of the vehicle, or a computing device adapter that connects to the vehicle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device associated with a vehicle, the computing device adapted to enable virtual communications with other vehicle computing devices, comprising:
   one or more processors;
   an input/output (I/O) interface; and
   one or more hardware-based memory devices storing computer-readable instructions which, when executed by the one or more processors, cause the computing device to:
   enter into an initial virtual chatroom inside which at least one other vehicle is a part;
   enable communications, through the I/O interface, to and from the at least one other vehicle, in which the communications are temporarily enabled; and
   based on a current driving scenario associated with the vehicle, enter into a subsequent virtual chatroom inside which at least one other vehicle is a part while the computing device continues receiving communications from the initial chatroom as well,
   wherein the driving scenarios for entering the subsequent chatroom include (i) a period over which vehicles have been within a pre-set distance to each other, (ii) proximity of one or more vehicles, (iii) the vehicles at or near a merging lane, stop sign, or stop light; (iv) a direction in which the vehicles are driving; and (v) a speed at which the vehicles are driving; and
   dropping a vehicle from the subsequent chatroom when the vehicle is no longer present in one or more of the driving scenarios.

2. The computing device of claim 1, wherein the initial and subsequent virtual chatrooms are transient and dynamic in that they persist while vehicle computing devices continue to join and leave the virtual chatrooms, based on each specific vehicle's driving scenario relative to the other vehicles.

3. The computing device of claim 1, wherein the initial and subsequent virtual chatrooms are hosted by a remote service with which the vehicle is in communication.

4. The computing device of claim 3, wherein the remote service invites the vehicle into the initial and subsequent virtual chatrooms to enable communications with other distinct vehicles.

5. The computing device of claim 4, wherein the vehicle automatically enters at least one of the initial or subsequent virtual chatrooms responsive to receiving the remote service's invitations.

6. The computing device of claim 4, wherein the vehicle accepts the remote service's invitation before entering at least one of the initial or subsequent chatrooms.

7. The computing device of claim 1, wherein at least one of the initial or subsequent virtual chatrooms are locally hosted on the vehicle's computer hardware, the at least one other vehicle's computer hardware, or a combination of both.

8. The computing device of claim 7, wherein the vehicle and the at least one other vehicle communicate over a short-range communication protocol.

9. The computing device of claim 8, wherein the short-range communication protocol includes any one or more of Bluetooth®, NFC (near field communication), or Wi-Fi.

10. The computing device of claim 7, wherein the vehicle invites the at least one other vehicle to its locally hosted virtual chatroom.

11. The computing device of claim 10, wherein each vehicle is configured to host its own virtual chatroom with other vehicles, such that either virtual chatrooms among distinct vehicles merge, or specific vehicles are invited into another vehicle's virtual chatroom.

12. The computing device of claim 1, wherein the vehicle enters virtual chatrooms using computer hardware that is part of the vehicle, or a computing device adapter that connects to the vehicle.

13. A method performed by a computing device associated with a vehicle, comprising:
based on a current driving scenario associated with the vehicle, entering into an initial virtual chatroom inside which at least one other vehicle is a part of, in which driving scenarios include information about at least one of the vehicle's speed, proximity to other vehicles, map data, location, and forward direction;
enabling communications, through an I/O interface, to and from the at least one other vehicle, in which the communications are temporarily enabled; and
based on an updated driving scenario associated with the vehicle, merging at least three individual virtual chatrooms into a single subsequent virtual chatroom, wherein the merge occurs when each of the vehicles are within a zone of communication to each other,
wherein the zone of communication includes (i) a period over which vehicles have been within a pre-set distance to each other, (ii) proximity of one or more vehicles; (iii) the vehicles at or near a merging lane, stop sign, or stop light, (iv) a direction in which the vehicles are driving; (v) a speed at which the vehicles are driving.

14. The computing device of claim 13, wherein the initial and subsequent virtual chatrooms are hosted by a remote service with which the vehicle is in communication.

15. The computing device of claim 14, wherein the remote service invites the vehicle into the initial and subsequent virtual chatrooms to enable communications with other distinct vehicles.

16. The computing device of claim 15, wherein the vehicle automatically enters at least one of the initial or subsequent virtual chatrooms responsive to receiving the remote service's invitations.

17. The computing device of claim 13, wherein at least one of the initial or subsequent virtual chatrooms are locally hosted on the vehicle's computer hardware, the at least one other vehicle's computer hardware, or a combination of both.

18. One or more hardware-based non-transitory computer-readable memory devices disposed in a computing device, the computer-readable instructions, when executed by one or more processors, cause the computing device to:
based on a current driving scenario associated with the vehicle, enter into an initial virtual chatroom inside which at least one other vehicle is a part of, in which driving scenarios include information about at least one of the vehicle's speed, proximity to other vehicles, map data, location, and forward direction;
enable communications, through the I/O interface, to and from the at least one other vehicle, in which the communications are temporarily enabled; and
based on an updated driving scenario associated with the vehicle, enter into a subsequent virtual chatroom inside which at least one other vehicle is a part while the computing device continues receiving communications from the initial chatroom as well, wherein the initial and subsequent virtual chatrooms are hosted by a remote service with which the vehicle is in communication,
wherein the driving scenarios for entering the subsequent chatroom include (i) a period over which vehicles have been within a pre-set distance to each other, (ii) proximity of one or more vehicles; (iii) the vehicles at or near a merging lane, stop sign, or stop light; (iv) a direction in which the vehicles are driving; and (v) a speed at which the vehicles are driving; and
dropping a vehicle from the subsequent chatroom when the vehicle is no longer present in one or more of the driving scenarios.

19. The one or more hardware-based non-transitory computer-readable memory devices of claim 18, wherein the vehicle enters virtual chatrooms using computer hardware that is part of the vehicle, or a computing device adapter that connects to the vehicle.

* * * * *